United States Patent
Bell

(10) Patent No.: US 9,159,247 B2
(45) Date of Patent: Oct. 13, 2015

(54) DENTAL PATIENT MODELS

(71) Applicant: Zimmer Dental, Inc., Carlsbad, CA (US)

(72) Inventor: Fred A Bell, Fair Oaks Ranch, TX (US)

(73) Assignee: Zimmer Dental, Inc., Carlsbad, CA (US)

( * ) Notice: Subject to any disclaimer, the term of this patent is extended or adjusted under 35 U.S.C. 154(b) by 0 days.

(21) Appl. No.: 13/900,145

(22) Filed: May 22, 2013

(65) Prior Publication Data

US 2013/0316319 A1 Nov. 28, 2013

Related U.S. Application Data

(63) Continuation of application No. 11/623,449, filed on Jan. 16, 2007, now Pat. No. 8,465,291.

(60) Provisional application No. 60/762,639, filed on Jan. 27, 2006.

(51) Int. Cl.
  *G09B 23/28* (2006.01)

(52) U.S. Cl.
  CPC ................................. *G09B 23/283* (2013.01)

(58) Field of Classification Search
  CPC ...... G09B 23/283; G09B 23/28; G09B 23/34; G09B 23/30; G09B 23/32
  USPC ................................................ 434/262–275
  See application file for complete search history.

(56) References Cited

U.S. PATENT DOCUMENTS

| | | |
|---|---|---|
| 2,095,511 A | 10/1937 | Oberto |
| 4,209,919 A | 7/1980 | Kirikae et al. |
| 4,416,634 A | 11/1983 | Beach |
| 5,102,340 A | 4/1992 | Berlinghoff |
| 5,158,488 A | 10/1992 | Berlinghoff et al. |
| 5,433,613 A | 7/1995 | Berlinghoff et al. |
| 5,480,307 A | 1/1996 | Lang et al. |
| 5,620,326 A | 4/1997 | Younker |
| 5,766,017 A | 6/1998 | Nevin et al. |
| 5,823,787 A | 10/1998 | Gonzalez et al. |
| 5,951,301 A | 9/1999 | Younker |
| 6,503,087 B1 | 1/2003 | Eggert et al. |
| 6,773,263 B2 | 8/2004 | Nicholls et al. |
| 6,998,894 B2 | 2/2006 | Lee et al. |
| 7,037,111 B2 | 5/2006 | Miller |
| 7,537,455 B2 | 5/2009 | Cope |
| 7,713,063 B2 | 5/2010 | Lee et al. |
| 8,465,291 B2 | 6/2013 | Bell et al. |
| 2007/0178429 A1 | 8/2007 | Bell |
| 2014/0272868 A1 | 9/2014 | Bell |

OTHER PUBLICATIONS

"U.S. Appl. No. 11/623,449 , Response filed Oct. 17, 2012 to Non Final Office Action mailed Jul. 17, 2012", 12 pgs.

(Continued)

*Primary Examiner* — Timothy A Musselman
(74) *Attorney, Agent, or Firm* — Schwegman Lundberg & Woessner, P.A.

(57) ABSTRACT

A model head including a jaw insert having layers of varying materials replicating the anatomical features of a human jaw. The jaw may include a mock nerve system that provides a signal to indicate the condition of the nerve. The jaw also may include a circulatory system including vessels that simulate the bleeding that occurs when a vessel in a human has been damaged.

20 Claims, 29 Drawing Sheets

(56) References Cited

OTHER PUBLICATIONS

"U.S. Appl. No. 11/623,449, Advisory Action mailed Jun. 30, 2011", 2 pgs.
"U.S. Appl. No. 11/623,449, Final Office Action mailed Apr. 12, 2011", 7 pgs.
"U.S. Appl. No. 11/623,449, Non Final Office Action mailed May 17, 2012", 11 pgs.
"U.S. Appl. No. 11/623,449, Non Final Office Action mailed Jul. 17, 2012", 10 pgs.
"U.S. Appl. No. 11/623,449, Non Final Office Action mailed Aug. 31, 2010", 5 pgs.
"U.S. Appl. No. 11/623,449, Non Final Office Action mailed Oct. 26, 2011", 6 pgs.
"U.S. Appl. No. 11/623,449, Notice of Allowance mailed Feb. 13, 2013", 6 pgs.
"U.S. Appl. No. 11/623,449, Response filed Jan. 18, 2012 to Non Final Office Action mailed Oct. 26, 2011", 11 pgs.
"U.S. Appl. No. 11/623,449, Response filed Jan. 24, 2011 to Non Final Office Action mailed Aug. 31, 2010", 15 pgs.
"U.S. Appl. No. 11/623,449, Response filed Jun. 6, 2011 to Final Office Action mailed Apr. 12, 2011", 14 pgs.
U.S. Appl. No. 14/290,340, filed May 29, 2014, Patient Models for Oral Surgery.
U.S. Appl. No. 11/623,449, filed Jan. 16, 2007, Dental Patient Models.
"U.S. Appl. No. 14/290,340, Non Final Office Action mailed Jul. 31, 2014", 8 pgs.

US 9,159,247 B2

DENTAL PATIENT MODELS

RELATED APPLICATIONS

This application is a continuation of U.S. patent application Ser. No. 11/623,449, filed on Jan. 16, 2007, entitled "Dental Patient Models" which claims the benefit of U.S. Provisional Patent Application No. 60/762,639, filed Jan. 27, 2006, and entitled Dental Patient Models and Methods of Making Same, both of which are hereby incorporated by reference in their entirety herein.

BACKGROUND

The present invention relates to dental patient models for performing dental procedures.

To develop skills, learn new techniques or demonstrate new products in the field of oral and maxillofacial surgery, it is beneficial for the student or practitioner to have the opportunity to perform surgical procedures on a repeated basis. Unfortunately, there are not always enough patients to provide a steady supply of opportunities. Furthermore, many patients tend to have different and unique problems, which does not allow equal and consistent opportunities.

In addition, the treatment protocol for which the student and practitioner need training may call for a series of procedures. For instance, the protocol may include site preparation and restoration, grafting, impressions, and prosthetic implantation, each of which may require a recovery time or preparation time in between each procedure. Accordingly, a treatment protocol may span over a year or more, thereby making it difficult to experience and fully appreciate the entire procedure. Therefore, it would be beneficial to perform lengthy protocols in a simulated and accelerated manner.

As an alternative to patients, cadavers are used for practicing procedures. However, because each cadaver presents a unique dental problem and the condition of a cadaver may be unpredictable, it is difficult to provide an equal basis for practice using cadavers. This also makes it difficult to assess performance relative to others.

As an alternative to both patients and cadavers, models have been developed to simulate a human head with a jaw designed for dental procedures. For example, these models have included a cart with dental equipment, such as a flushing device, drills, a suction device, and a model head mounted thereon. The model head includes a jaw opening, a model jaw insert, and non-functional eyes. The model jaw insert is disposed within the model head and is accessible through the jaw opening. The jaw insert includes teeth on which dental procedures can be performed. The human models have a number of shortcomings associated with their rudimentary structure and, consequently, do not provide a vivid, realistic experience in performing many surgical procedures.

Accordingly, a need remains for a patient model that can provide a more realistic and consistent opportunity to perform both routine and complex oral surgical procedures.

DETAILED DESCRIPTION OF THE PREFERRED EMBODIMENTS

Figure 1:
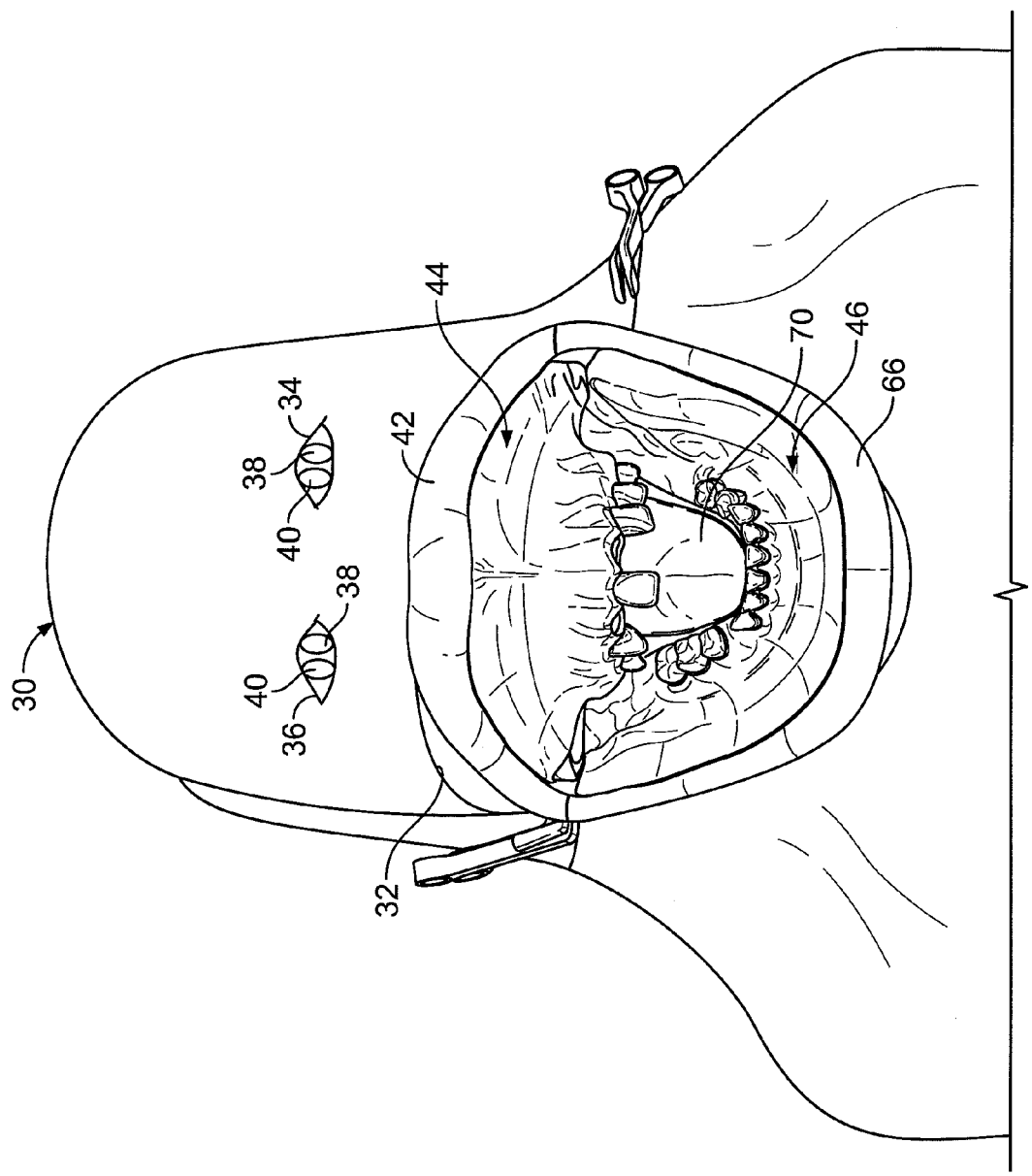
FIG. 1 is a front view of a patient model according to one embodiment of the present invention.

Referring to FIG. 1, there is illustrated a model head 30 according to one embodiment of the present invention. The model head 30 is adapted to be mounted on a suitable support structure, such as a table or a mobile simulator cart. The model head 30 generally includes a jaw opening 32 and functional left and right eyes 34 and 36. As is described in further detail below, each of the eyes 34 and 36 includes at least one indicator, but for this example, both eyes 34 and 36 include a first indicator 38 and a second indicator 40. The first and second indicators 38 and 40 are adapted to provide a visual indication of the patients nerve condition.

The model head 30 includes a model jaw insert 42 that is accessible through the jaw opening 32. The model jaw insert 42 is constructed to correspond to the anatomy of the mouth and related aspects of a human. For instance, the model jaw insert 42 is constructed of layers having varying material properties to fairly represent the different features and aspects of a human mouth. The structure of the model jaw insert 42 (hereinafter "jaw 42") will be discussed first and then the method, assembly, and composition of the layers and components will be described.

Figure 2:
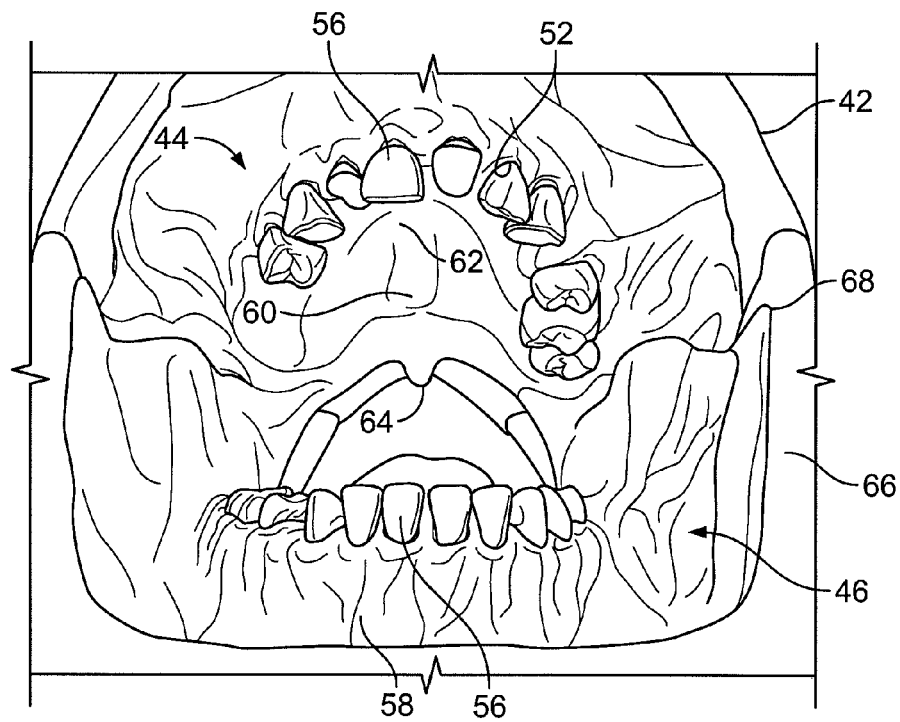
FIG. 2 is an enlarged view of the model jaw of the patient model of FIG. 1.
Figure 3:
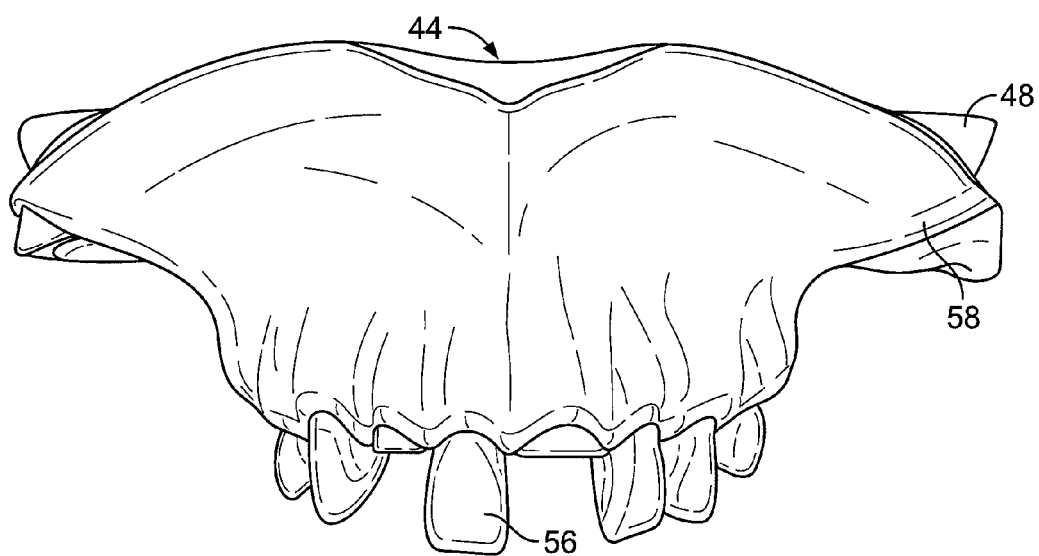
FIG. 3 is a front view of the maxilla of the patient model of FIG. 1.
Figure 4:
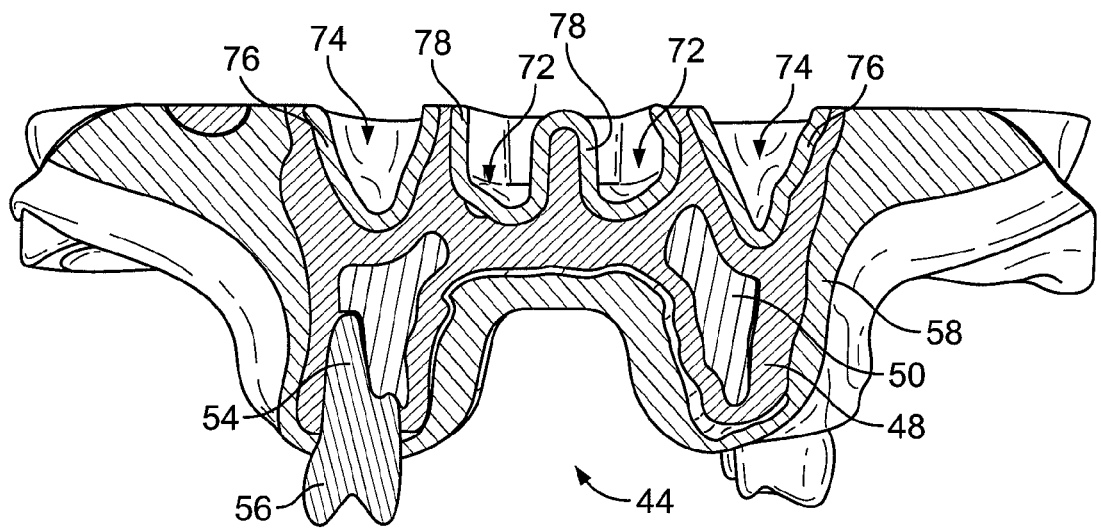
FIG. 4 is a sectional view of the maxilla of FIG. 3.
Figure 5:
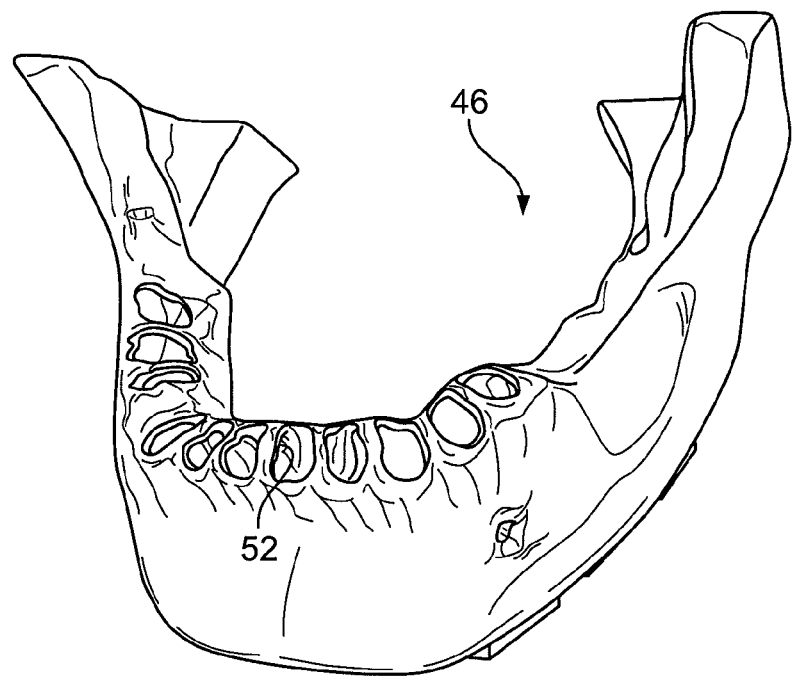
FIG. 5 is a perspective view of the model bone structure of the mandible of the patient model of FIG. 1.
Figure 6:
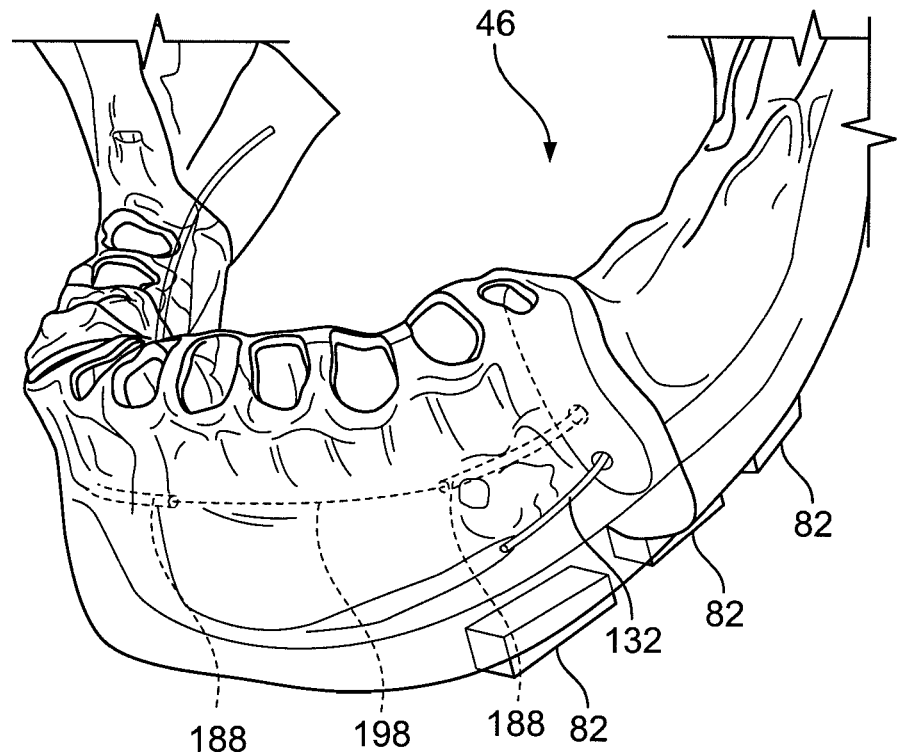
FIG. 6 is an enlarged perspective view of the mandible of FIG. 5 with the front portion of the mandible in phantom.
Figure 7:
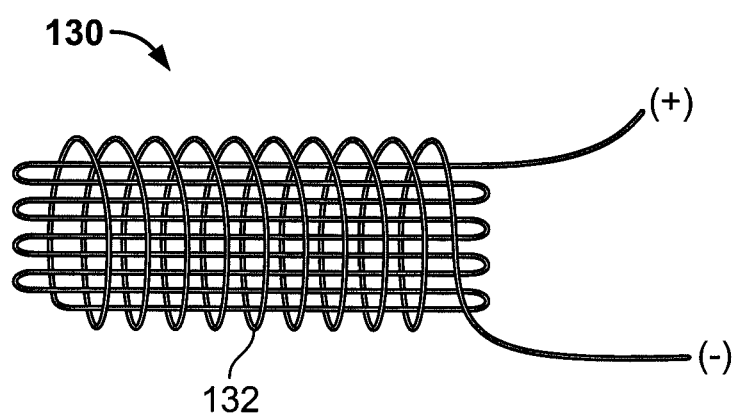
FIG. 7 is a partially assembled view of a wire configuration used for a mock nerve system in the patient model of FIG. 1.
Figure 8:
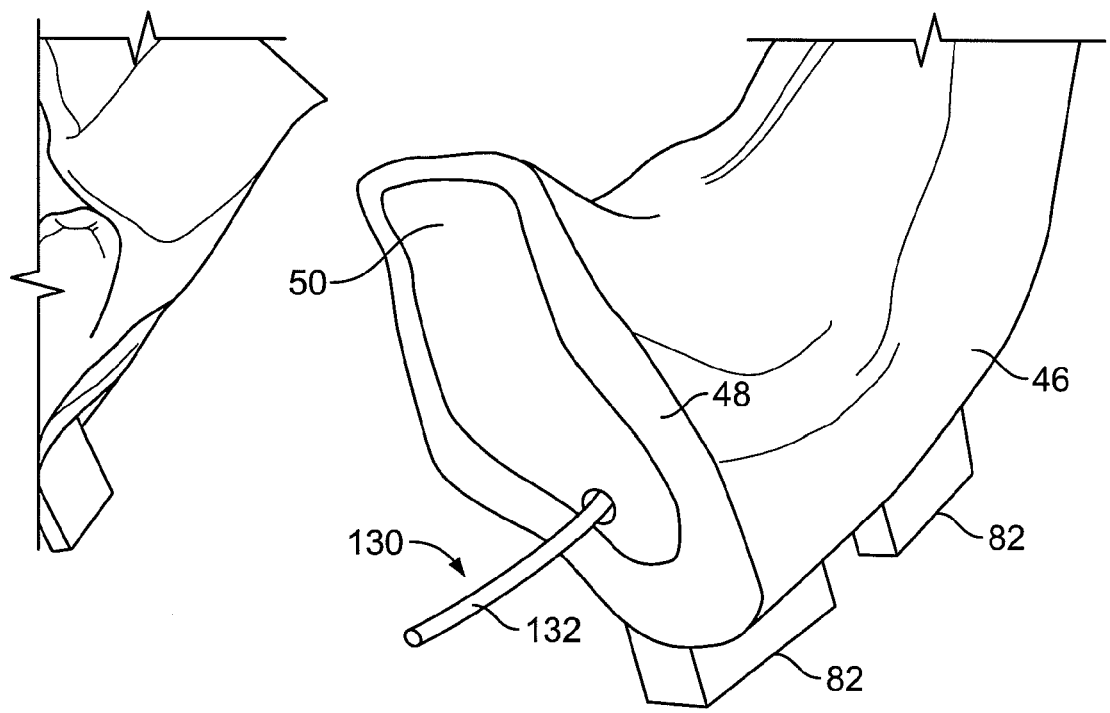
FIG. 8 is a sectional view of the mandible of FIG. 5.
Figure 28:
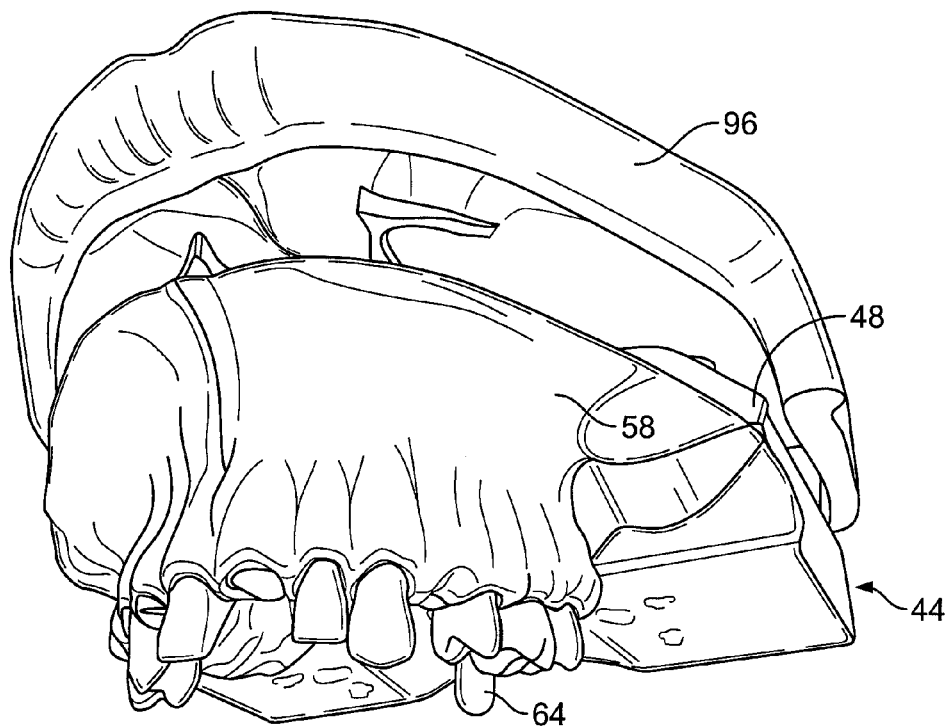
FIG. 28 is a perspective view of the maxilla of FIG. 27 with a buccal mucosa/tip layer being mounted thereon according to one embodiment of the present invention.
Figure 29:
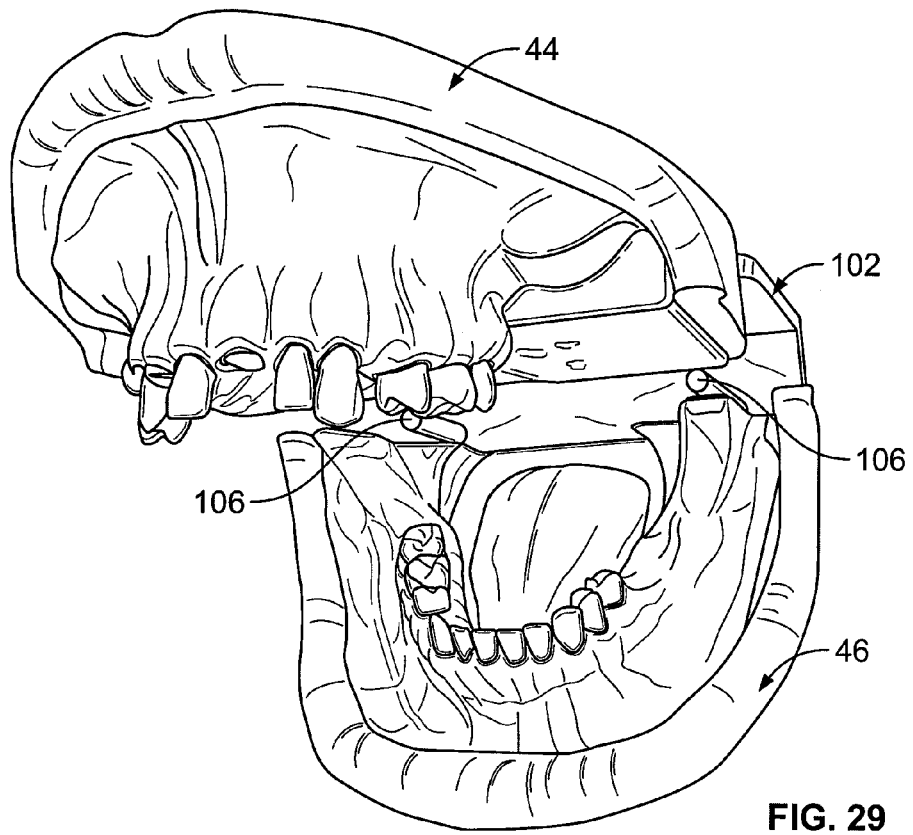
FIG. 29 is a perspective view of the maxilla of FIG. 28 being mounted on the frame of FIG. 24 to produce a model jaw insert according to one embodiment of the present invention.

Referring to FIGS. 1-10, the jaw 42 includes an upper jaw or maxilla 44 and a lower jaw or mandible 46 that are illustrated in an exaggerated open position to resemble the retracted position of the lips and cheeks during oral surgery. The maxilla 44 and the mandible 46 include a cortical layer 48 and a cancellous layer 50, which together replicate the jaw bones of a human maxilla and mandible (FIGS. 4 and 8). The maxilla 44 and the mandible 46 define a number of sockets 52 that each receive a root 54 of a tooth 56 (FIGS. 2, 4 and 5). A gingival layer 58 is disposed over the cortical layer 48 of both the mandible 46 and the maxilla 44 and also may form a soft palate 60, a hard palate 62 and an uvula 64 (FIGS. 2 and 28). The gingival layer 58 is attached to the cortical layer 48 by a synthetic periosteum layer (not shown). A layer forming lips 66 and the buccal mucosa (inner cheeks) 68 extends over the gingival layer 58. The jaw 42 also includes a pliable tongue 70 affixed at a proximal location to the mandible 46.

Figure 10:
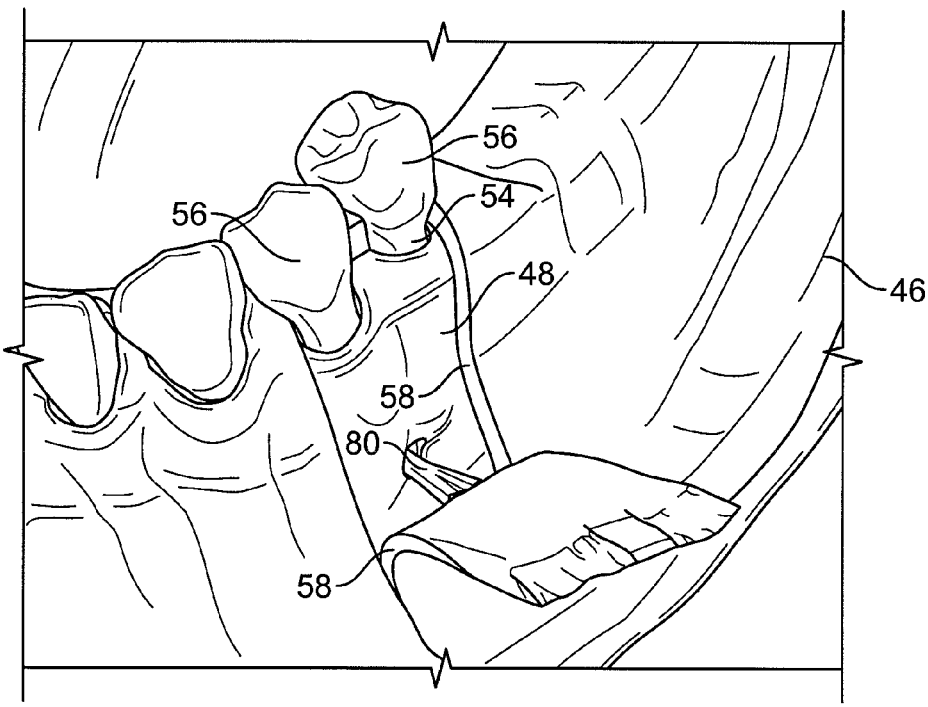
FIG. 10 is an enlarged view of the mandible of FIG. 5 with teeth and a gingival layer covering the bone structure.
Figure 11:
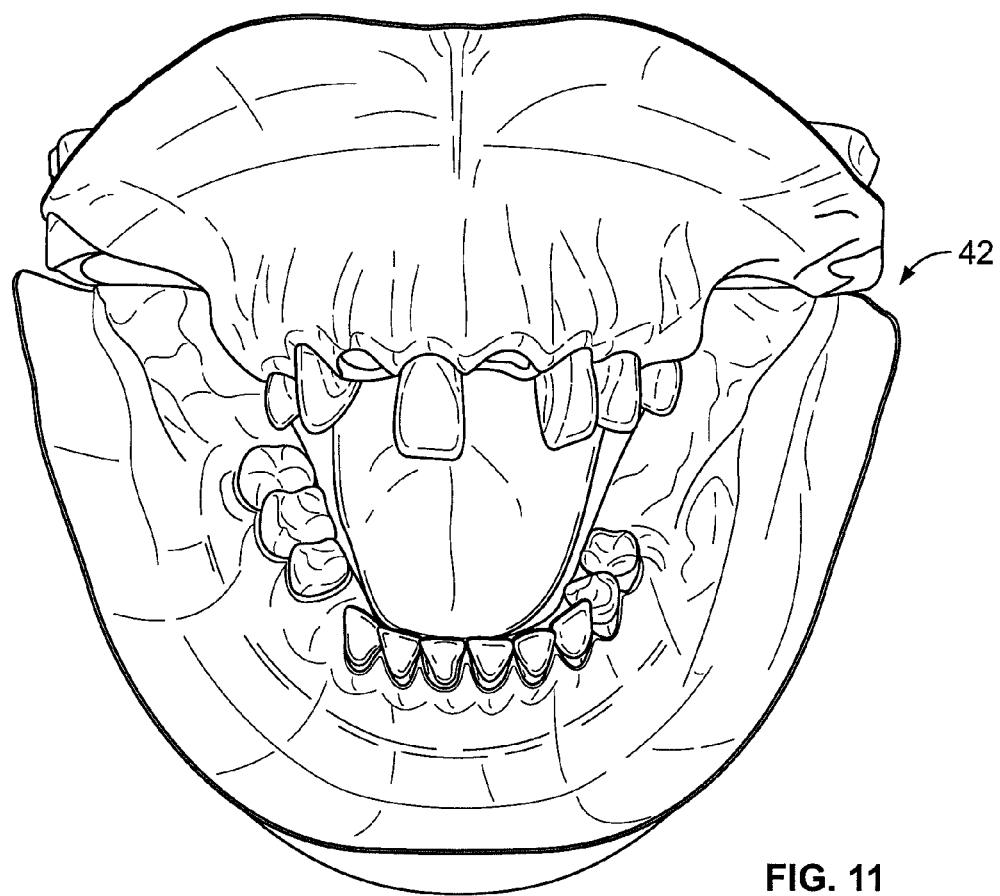
FIG. 11 is a front view of an assembled model jaw insert according to one embodiment of the present invention.
Figure 12:
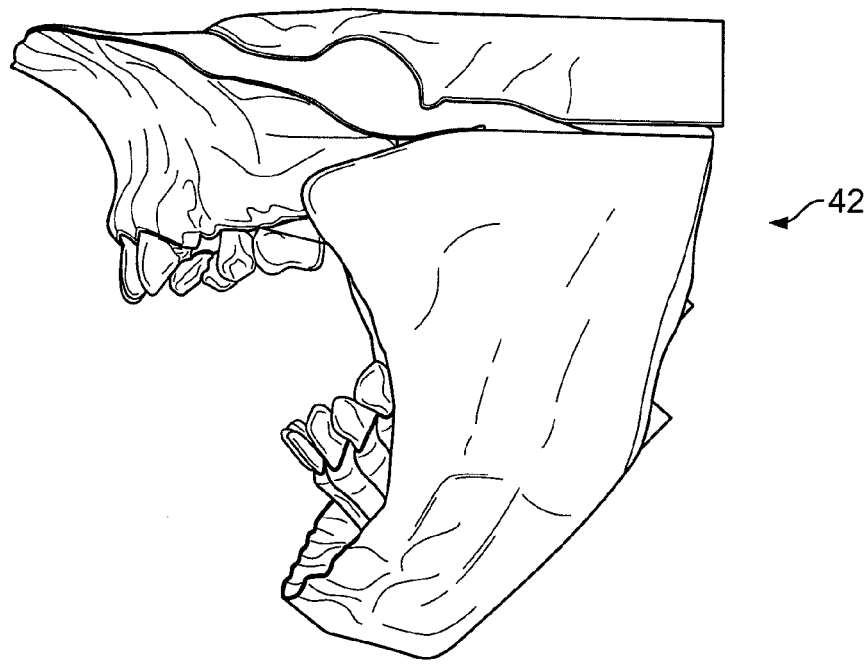
FIG. 12 is a side view of the assembled model jaw insert of FIG. 11.
Figure 14:
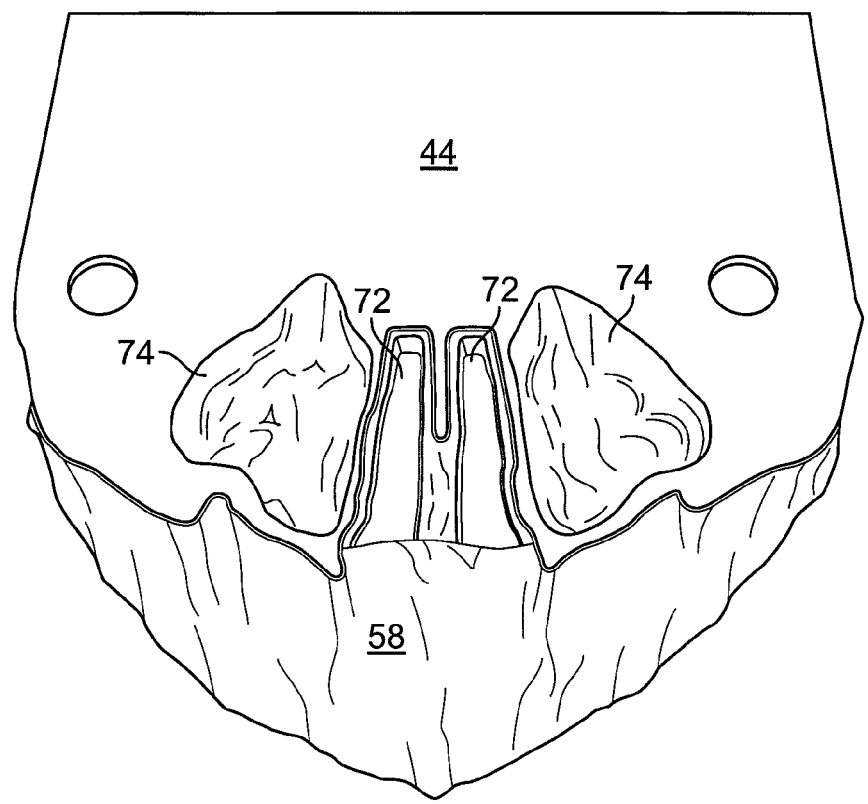
FIG. 14 is a top view of the assembled model jaw insert of FIG. 11.

Turning to FIGS. 3, 4 and 14, the maxilla 44 forms a pair of nasal passages 72 and corresponding maxillary sinuses 74. A pair of soft mucosa layers 76 and 78 line the maxillary sinuses 74 and the nasal passages 72, respectively. Referring to FIG. 10, the jaw 42 may include periodontal ligaments 80 coupling the teeth 56 to the gingival layer 58 and the sockets 52 (FIG. 5). In addition, the mandible 46 may include riser blocks 82 (as shown in FIG. 8) extending downwardly from the medial side of the posterior aspects of the mandible 46. The mandible 46 and the maxilla 44 also include a periosteum layer (not shown) coupling the gingival layer 58 to the underlying cortical layer 48. Each of the layers and components described above may be made of different materials to realistically replicate the properties of the natural layers and components of a human jaw. The jaw 42 also may include additional layers including connective tissue, muscles and glands to even further replicate features of the human mouth.

The following describes a process of making and assembling the jaw 42 with reference to FIGS. 15-34. First, a computer tomography (CT) scan is taken of a human head to obtain a three-dimensional (3-D) image of the person's oral and maxillofacial region. The CT scan provides multiple sectional images of the person's head taken in small slices. The sectional images are then converted to a digital format recognizable by a 3-D animation and modeling software, such as FreeForm® available from SensAble Technologies, Inc, of Woburn, Mass. Other alternative 3-D animation or modeling software may be used for this purpose. The 3-D modeling software is used to build a digital, 3-D model of the person's oral and maxillofacial region using the converted CT images. The 3-D model includes the multiple layers and components of the person's oral and maxillofacial region, including the cortical, cancellous and gingival layers, the tongue, cheeks, lips, sinuses and nasal passages.

Next, using the 3-D model, individual, discrete molds are formed for each layer and component of the person's oral and maxillofacial region. It will be understood that the 3-D model or the molds may be modified so that CT scans from a single person may be used to make a number of different jaws. Using a known molding process, such as injection molding, models of each layer and component are produced from the individual molds. The models of each layer may be formed using polymer-based materials, such as urethanes. The material of each artificial layer varies similar to the actual properties of the human layers. For instance, the cortical layer may be comprised of a polymer resin that is relatively dense and rigid when cured, such as M11 urethane with a hardness of 70 durometer shore D, while the cancellous layer may be molded of a polymer that is more porous and slightly less rigid when cured, such as a 70 durometer shore D urethane base with 40% by weight of a micro-bulb filler and a foaming agent, such as water. The layers replicating the softer tissues may be formed of polymers that cure to a flexible, soft, and pliable state, such as F-15 urethane rubber with a hardness of 15 durometer shore A for the tongue, gingival layer, periodontal membrane (soft tissue around tooth roots), and the sinus membrane. The teeth may be formed by any known means and known composition used to form prosthetic teeth, but in one case is formed of #782 urethane polymer resin with a hardness of 68 durometer shore D as is the cheek and lips. The periosteum layer is made of F-55 urethane rubber with a hardness of 55 durometer shore A, and the connective tissue is made of #265 urethane foam with a density of 4 pcf. Once formed, the model layers are assembled to form the jaw 42. In some cases, such as with the cancellous and cortical layers, the layer may be over-molded directly onto the underlying layer. With these structures, the mold can be used for a wide variety of procedures including, but not limited to, any dentoalveolar and related oral and maxillo-facial surgical procedures.

Figure 15:
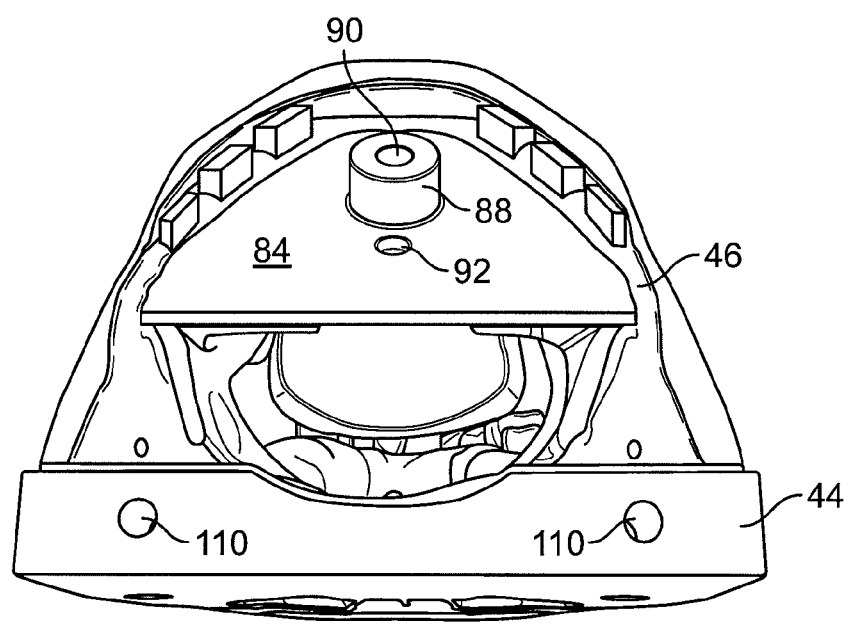
FIG. 15 is a bottom view of the assembled model jaw insert of FIG. 11.
Figure 16:
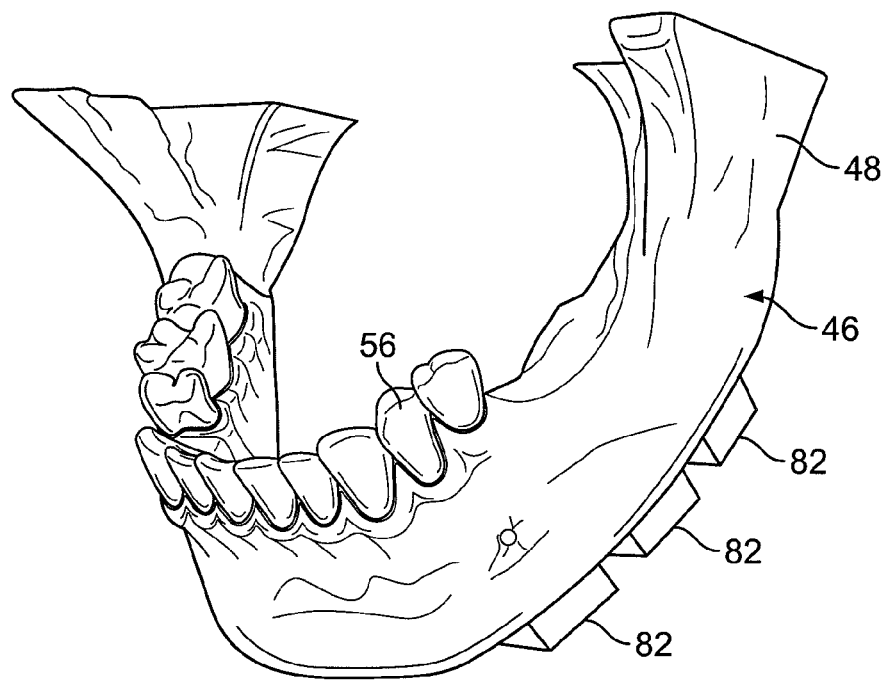
FIG. 16 is a perspective view of the model bone structure of a mandible of a model jaw insert according to one embodiment of the present invention.
Figure 17:
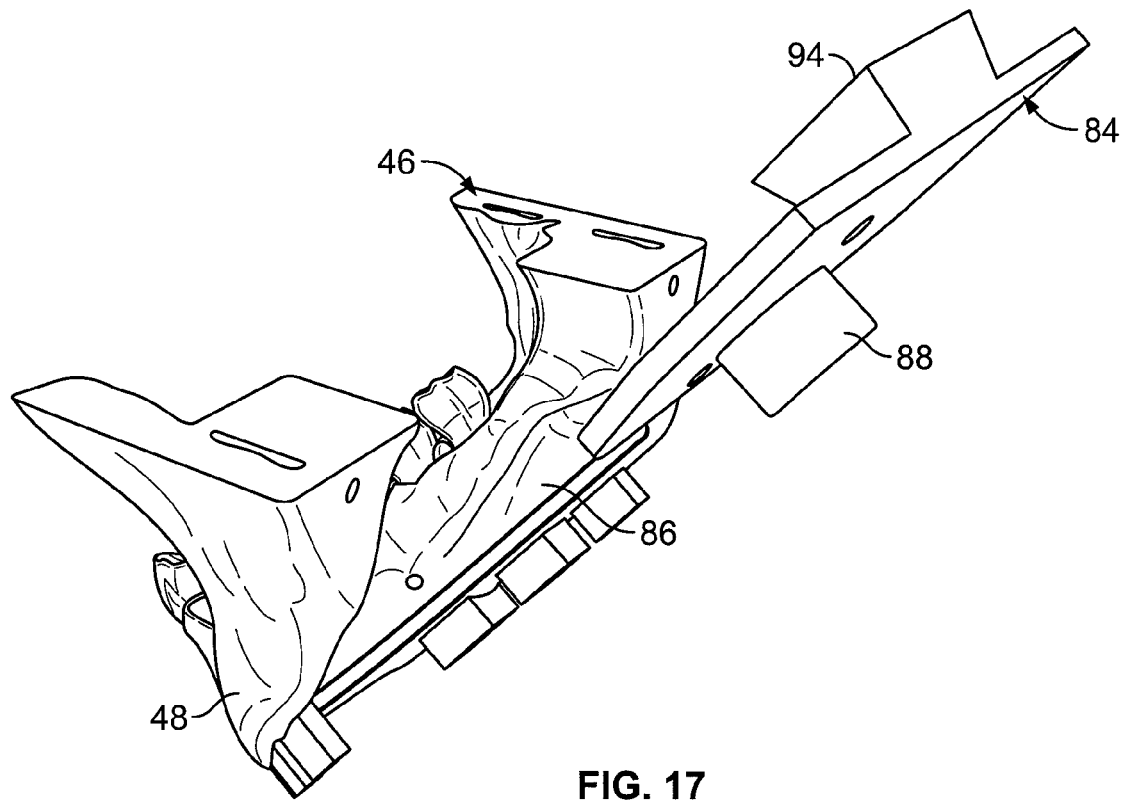
FIG. 17 is a perspective view of the mandible of FIG. 16 being mounted on a mandible base plate according to one embodiment of the present invention.

Referring now to FIGS. 16-22, the cancellous and the cortical layers 48, 50, respectively (shown in FIG. 6) are assembled to form the bone structure of mandible 46. The teeth 56 are then positioned in the sockets 52 (FIG. 5). A mandible base plate 84 is then slid into grooves 86 formed in the underside of the mandible 46. As best shown in FIGS. 15 and 17, the mandible base plate 84 includes a stem 88 protruding downwardly from the underside of the mandible base plate 84. The stem 88 defines a fastener receiving hole 90 extending concentrically therein. A pair of peg receiving holes 92 (FIG. 13) each extend through the mandible base plate 84 adjacent and on opposing sides of the stem 88. A tongue support 94 extends upwardly from the top of the mandible base plate 84.

Figure 13:
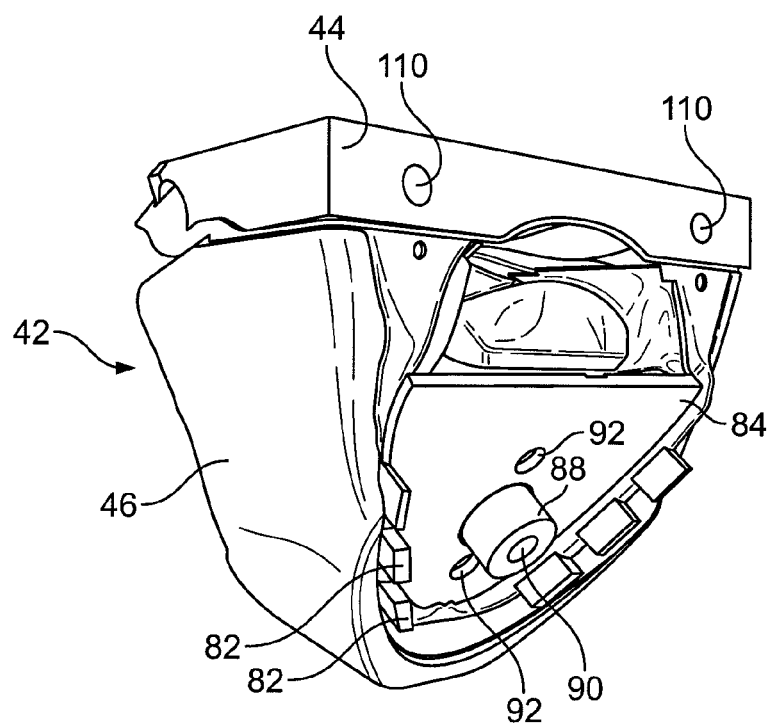
FIG. 13 is a perspective view of the assembled model jaw insert of FIG. 11.
Figure 18:
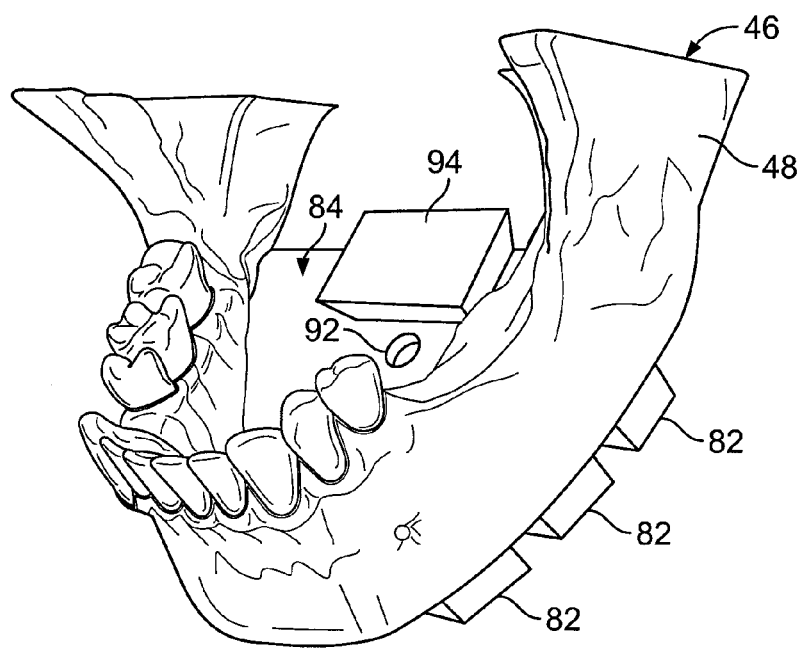
FIG. 18 is a perspective view of the mandible of FIG. 16 mounted on the mandible base plate in accordance with the embodiment of FIG. 17.
Figure 19:
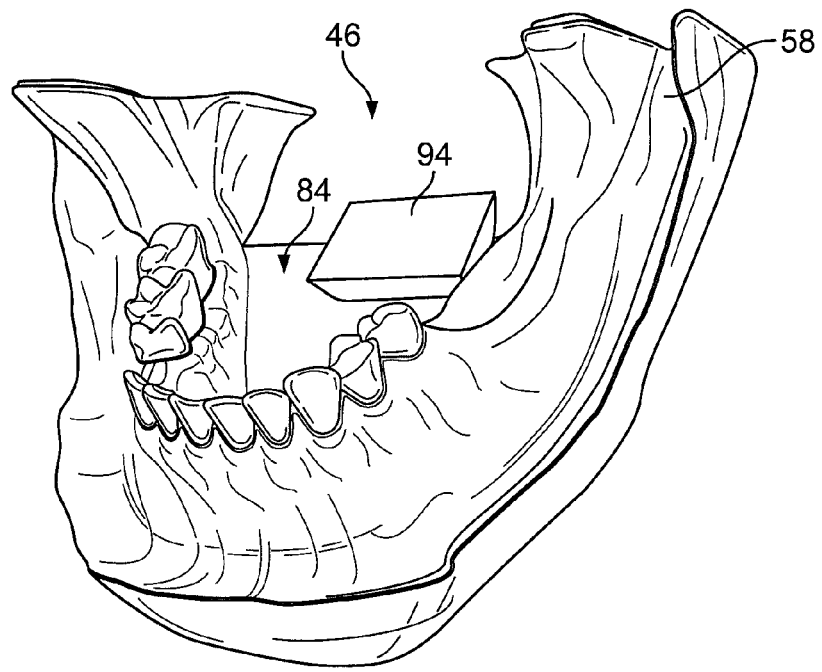
FIG. 19 is a perspective view of the mandible of FIG. 18 with a gingival layer covering the bone structure.
Figure 20:
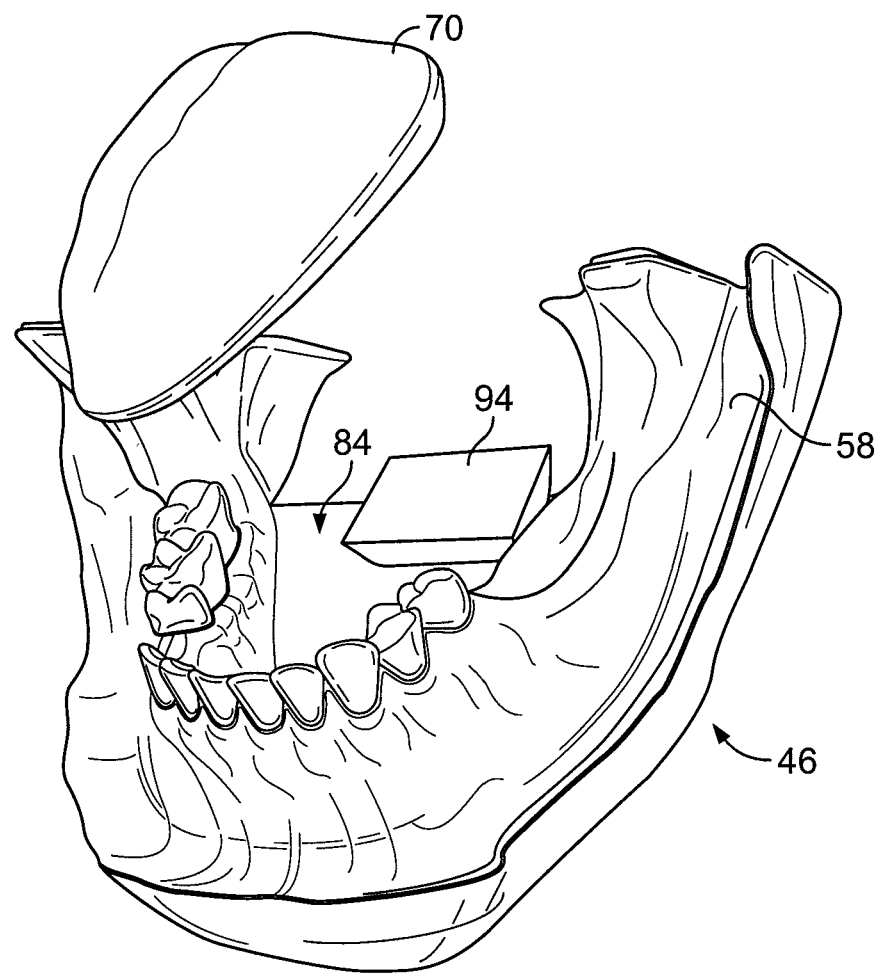
FIG. 20 is a perspective view of the mandible of FIG. 19 and a tongue being mounted on the mandible base plate in accordance with the embodiment of the present invention.
Figure 21:
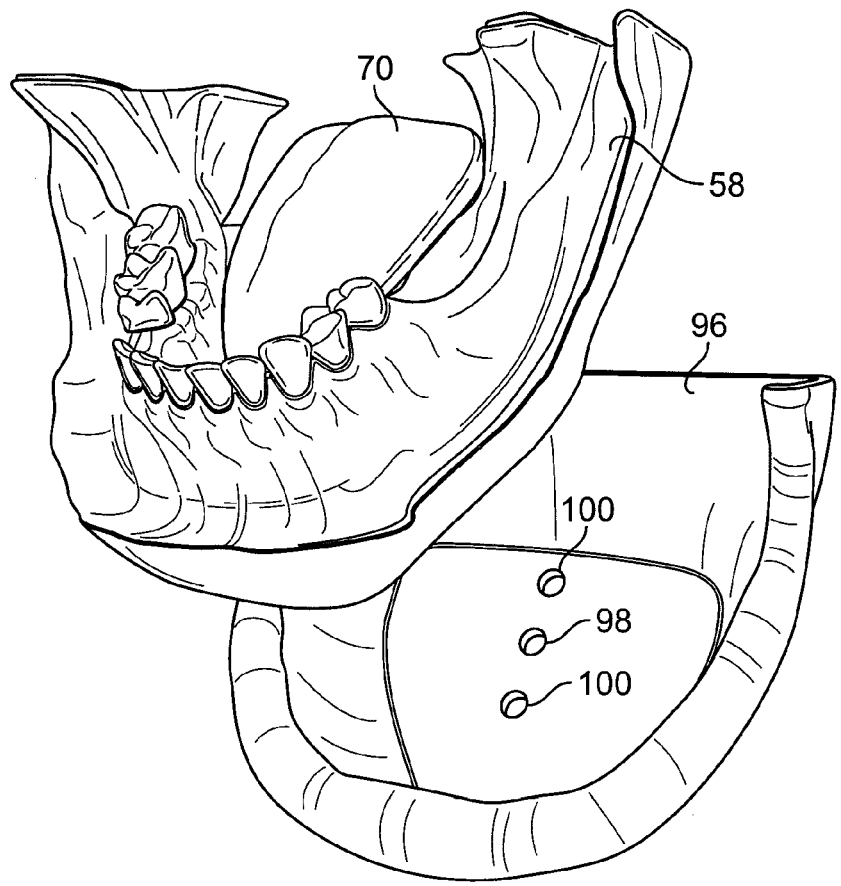
FIG. 21 is a perspective view of the mandible of FIG. 20 with the tongue mounted on the mandible base plate and a buccal mucosa/lip layer being mounted therein in accordance with the embodiment of the present invention.
Figure 22:
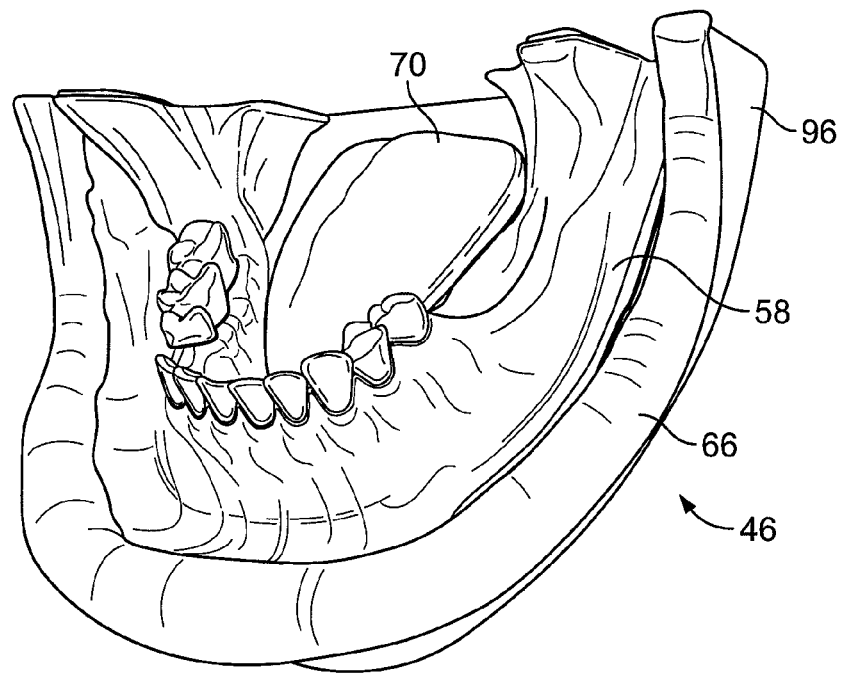
FIG. 22 is a perspective view of the mandible of FIG. 21 with the buccal mucosa/lip layer mounted thereon.

With reference to FIGS. 18 and 19, the gingival layer 58 is then fitted over the cortical layer 48. Then, the tongue 70 is mounted on the tongue support 94, as shown in FIG. 20, and secured together by adhesives, fasteners or other devices. The lip 66 combined with a buccal mucosa layer 96 form self-retaining cheeks, which are then fitted about the edge of the gingival layer 58 and the cortical layer 48, as illustrated in FIGS. 21-22. The lip/buccal mucosa layer 96 defines a fastener receiving hole 98 and a pair of peg openings 100 extending through the lip/buccal layer 96. The peg openings 100 are each on opposite sides of the fastener receiving hole 98. When the lip/buccal mucosa layer 96 is fitted to the gingival and cortical layers 58, 48, the hole 98 aligns with the fastener receiving hole 90 of the stem 88 (FIG. 15), and the openings 100 each align with one of the peg holes 92 (FIG. 13).

Figure 23:
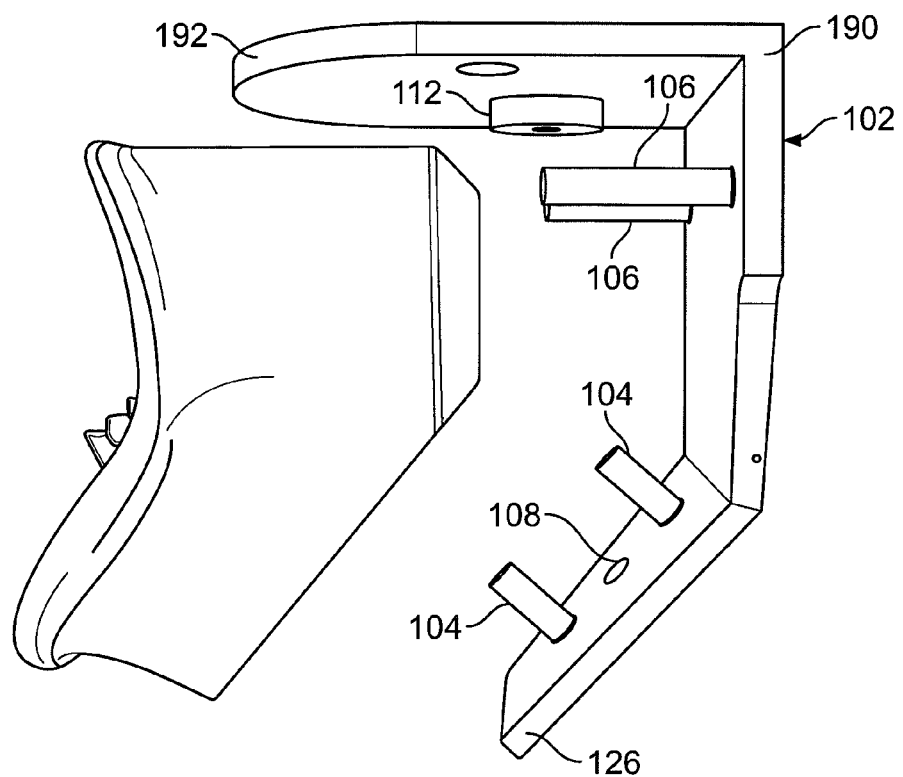
FIG. 23 is a perspective view of the mandible of FIG. 22 being mounted on a frame according to one embodiment of the present invention.
Figure 24:
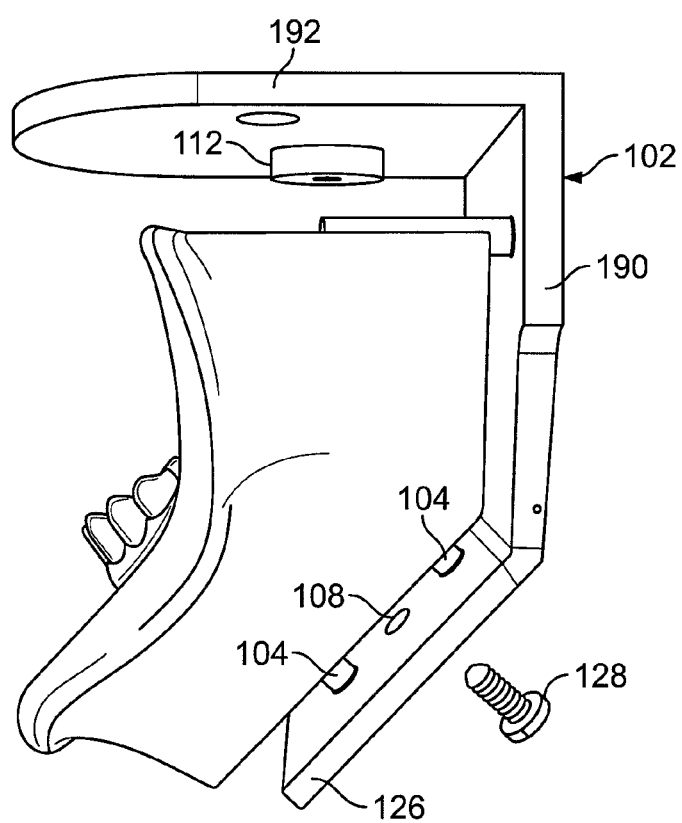
FIG. 24 is perspective view of the mandible of FIG. 23 being secured to the frame.
Figure 25:
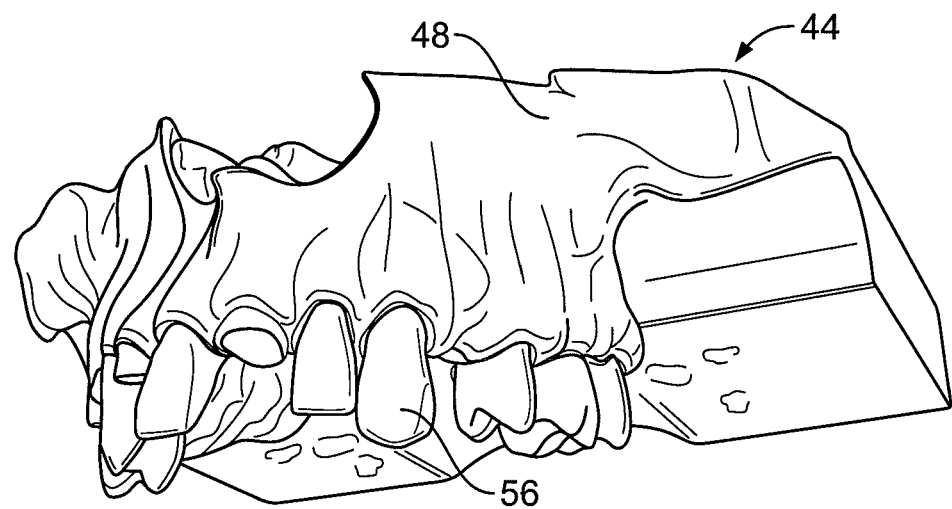
FIG. 25 is a perspective view of the bone structure of a maxilla of a model jaw insert according to one embodiment of the present invention.

As shown in FIGS. 23-24, the assembled mandible 46 is then mounted on a frame 102 by inserting a pair of pegs 104 extending from a first panel 126 of the frame 102 through the holes 100 in the lip/buccal mucosa layer 96 (FIG. 21) and into the peg receiving holes 92 (FIGS. 13 and 15) of the mandible base plate 84. While a fastener 128, described below, may be sufficient to mount the mandible to the frame 102 without the pegs 104, the pegs may still be desired to limit unintentional rotation of the assembled mandible 46. As illustrated in FIG. 24, the fastener 128 is inserted through a fastener receiving opening 108 in the first panel 126 of the frame 102 and the fastener receiving hole 98 in the lip/buccal mucosa layer 96 and into engagement with the internally threaded fastener receiving hole 90 of the stem 88. Tightening of the fastener 128 secures the frame 102 to the mandible 46. Here the benefit of the risers 82 and the stem 88 (FIG. 13) are realized. The risers 82 and the stem 88 space the bone structure (the cortical and cancellous layers 48 and 50) from the surface of frame 102 such that a user may have human-like access to the underside of the jaw. The risers 82 are located only on the medial side of the lateral (posterior) aspects of the mandible and not in the front so as not to block access via the front (chin) area.

Figure 26:
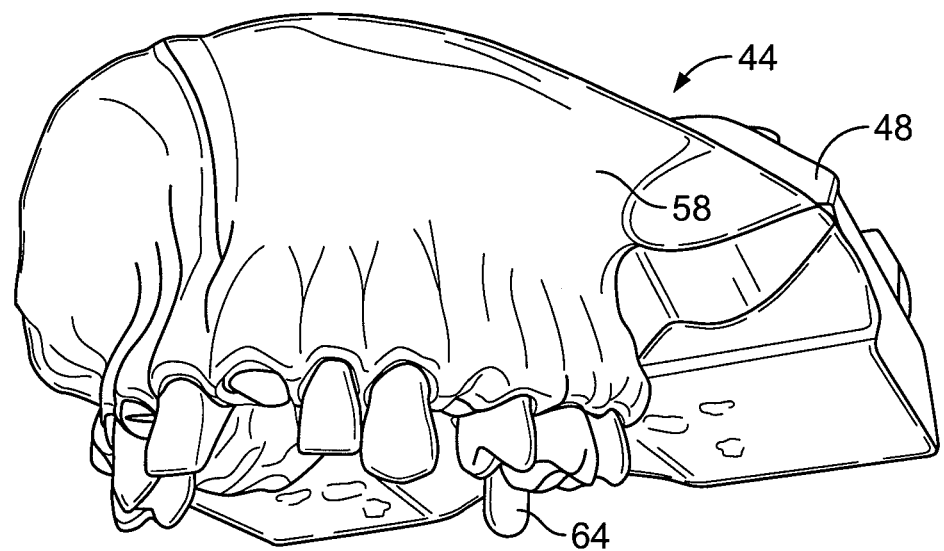
FIG. 26 is a perspective view of the maxilla of FIG. 25 with a gingival layer covering the bone structure.
Figure 27:
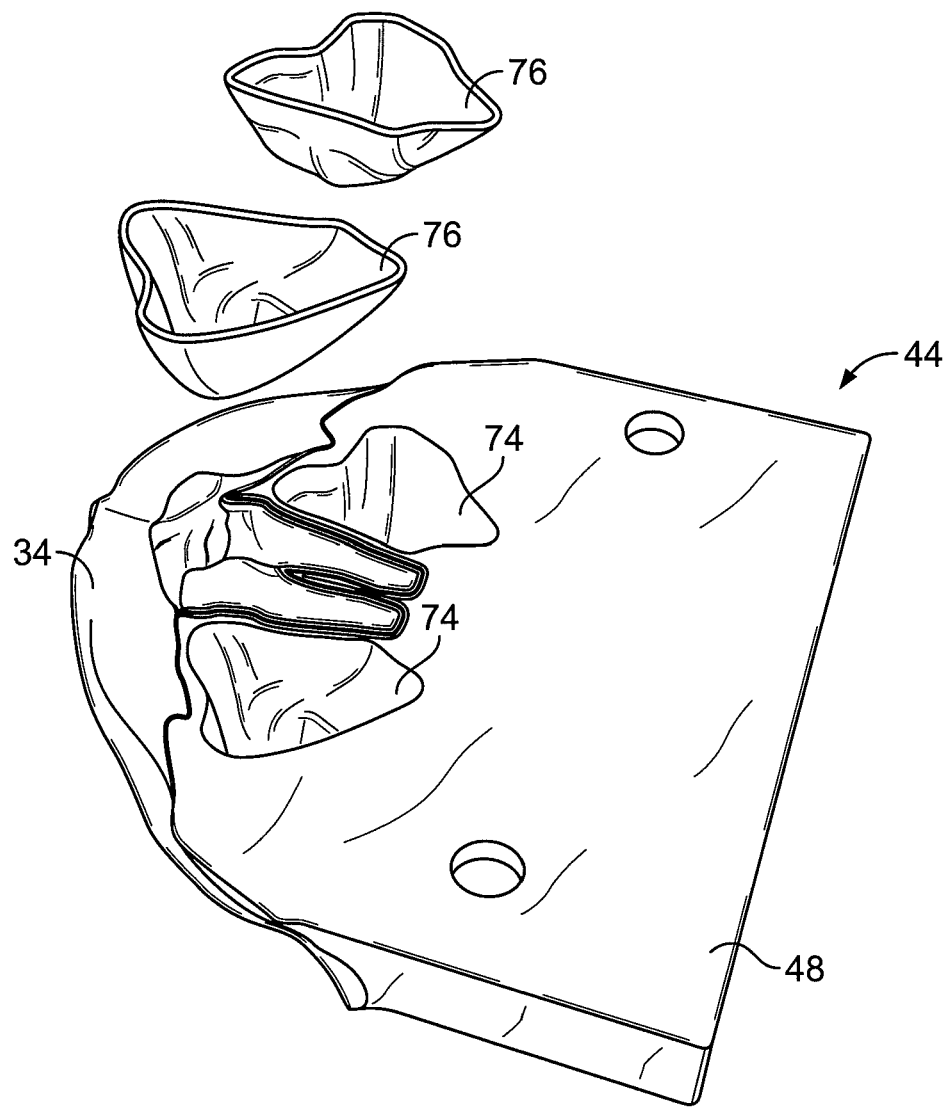
FIG. 27 is a perspective view of the maxilla of FIG. 26 with sinus linings being mounted thereon according to one embodiment of the present invention.

Referring now to FIGS. 25-29, the cortical layer 48 and the cancellous layer 50 (FIG. 4) are molded or assembled together to form the bone structure of the maxilla 44, and the teeth 56 are installed in the sockets 52. A synthetic periodontal ligament 80 affixes the teeth 56 within the sockets 52 as with the teeth 56 for the mandible 46 (FIG. 10). The socket 52 may be configured to allow additional space for the placement of the ligament 80. Next, the gingival layer 58, including the uvula 64 (FIG. 28), is fitted over the cortical layer 48, as shown in FIG. 26, and the mucosa sinus lining layers 76 are fitted into the maxillary sinuses 74, as shown in FIG. 27. The upper tip/buccal mucosa layer 96 is then fitted atop the cortical layer 48 and over the sinuses 74. The assembled maxilla 44 now may be mounted on the frame 102 by inserting a pair of pegs 106 extending from a second panel 190 of the frame 102 into a pair of corresponding peg holes 110 (FIG. 13) defined by the cortical layer 48.

Figure 30:
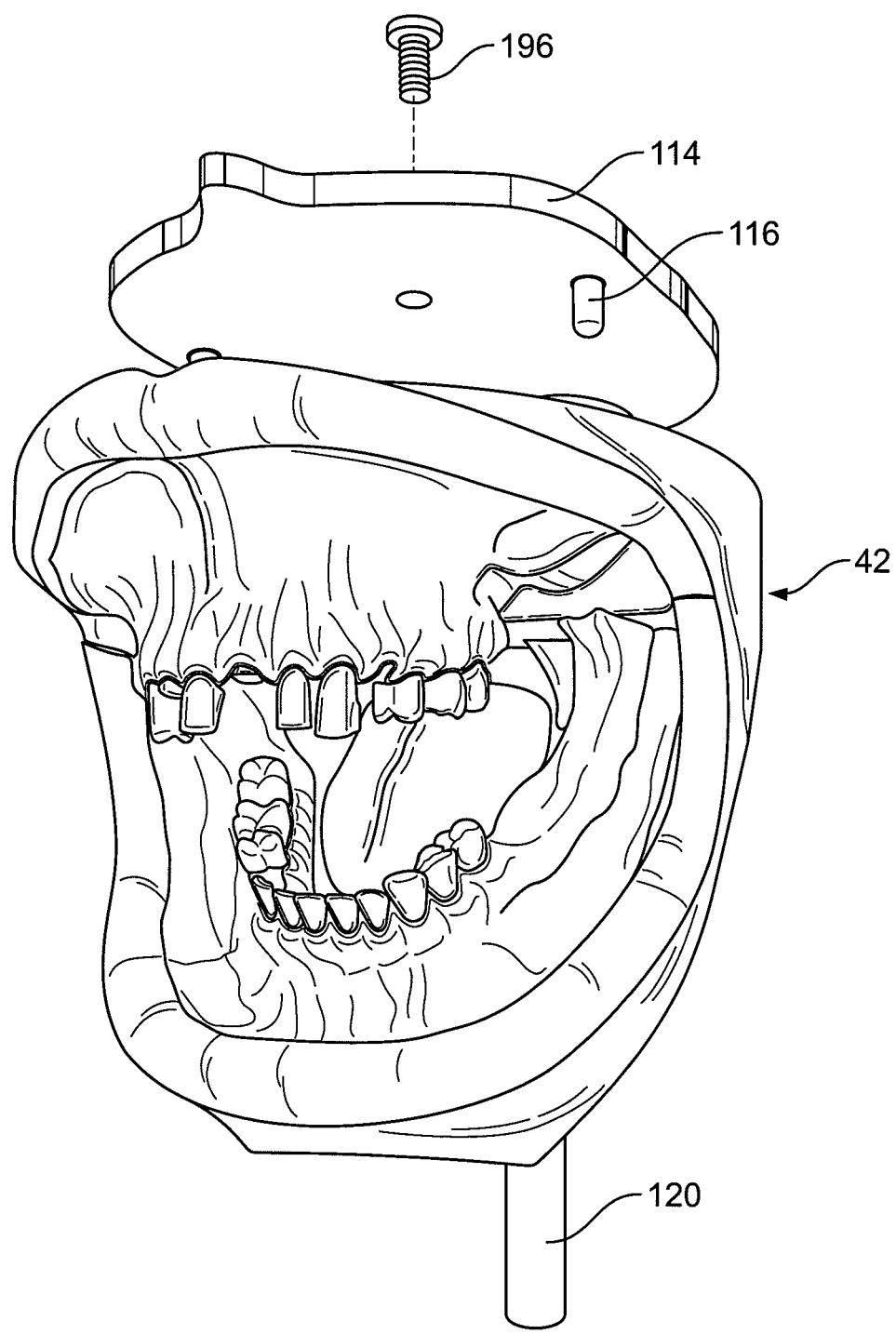
FIG. 30 is a perspective view of the model jaw insert of FIG. 29 with a mounting plate being mounted thereon according to one embodiment of the present invention.

A third panel 192 of the frame 102 defines a pair of pin holes 112 (FIG. 23). As shown in FIG. 30, the assembled jaw 42 (FIG. 28) is mounted to a mounting plate 114 by inserting a pair of pins 116 extending from the mounting plate 114 into the pin holes 112 of the third plate 192 of the frame 102. A fastener, such as a screw 196, secures the mounting plate 114 to the third plate 192, which in turn, secures the pegs 116 in the maxilla 44. This secures the maxilla 44 on the pegs 106 of the second plate 190. The maxilla 44 may also be attached to the mandible 46 by interlocking tabs, other fasteners, or similar devices.

It will be understood that there are many different ways to secure the jaw 42 to the frame 102 and the frame to the mounting plate 114 including structures with or without pegs and screws.

Figure 31:
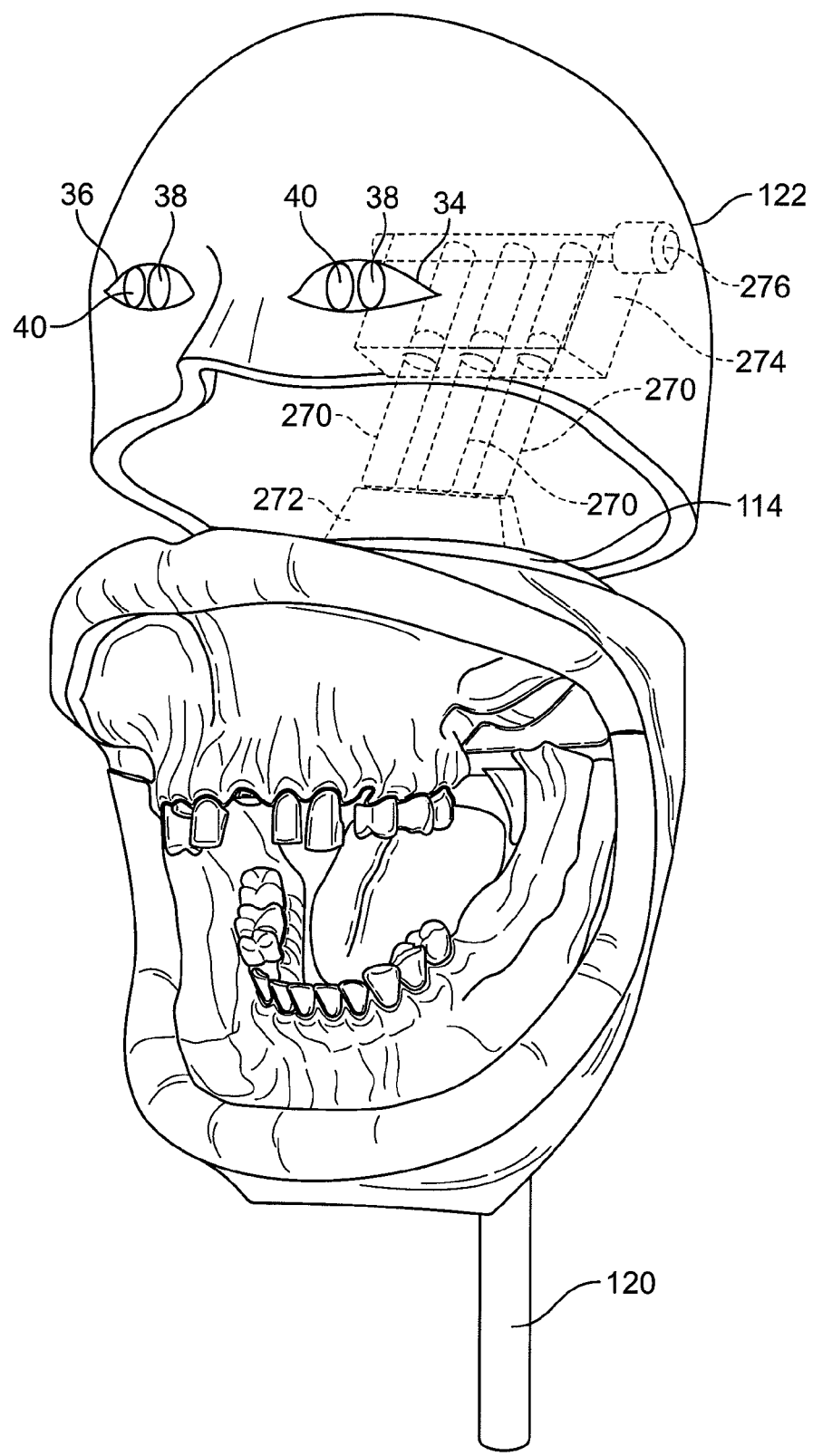
FIG. 31 is the model jaw insert of FIG. 30 with a skull cap being mounted thereon according to one embodiment of the present invention.
Figure 32:
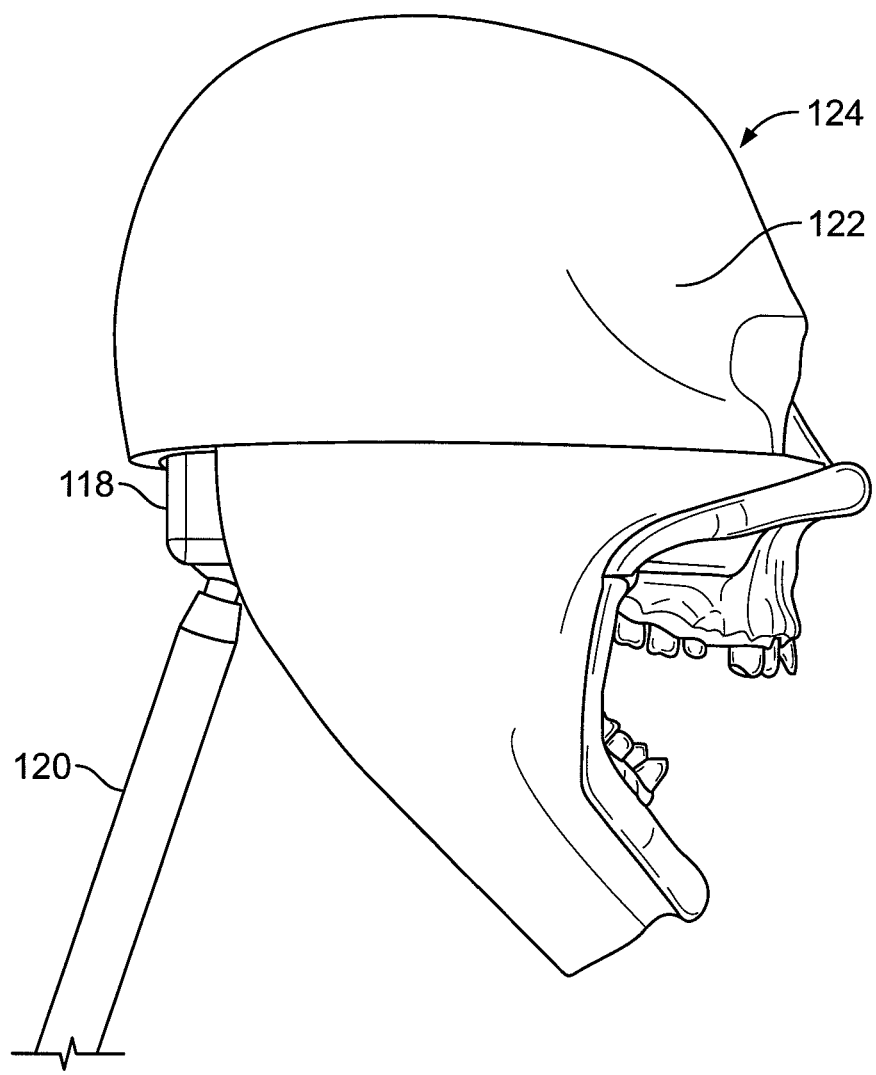
FIG. 32 is a perspective view of an assembled model head according to one embodiment of the present invention.

As illustrated in FIGS. 30-32, the mounting plate 114 is attached via a ball and socket joint 118 to a mounting rod 120. A skull cap 122 is then press-fit mounted onto the perimeter of the mounting plate 114 to form the completed head 124 (shown in FIGS. 3-34). Other than a press-fit, the skull cap 122 may be secured to the mounting plate 114 by many other devices such as fasteners or adhesives to name a few examples. As shown in FIG. 31 in dashed line, by one approach, the skull cap 122 can be secured to the mounting plate 114 by a piston-type structure with one or more posts 270 fixed to a base 272 on the mounting plate 114. The posts 270 reciprocate and lock within block 274 secured to the skull cap 122. A spring loaded release button 276 extends out of the skull cap 122 and engages the posts 270 so that the button 276 can be depressed to slide the skull cap 122 over the posts 270.

The completed head 124 may be installed via mounting die rod 120 on a mobile cart, table, or other support structure. As shown in FIG. 32, the ball and socket joint 118 enables the head 124 to pivot and tilt relative to the rod 120 and a structure, such as the table or the cart, to which it is attached to simulate the freedom of movement of a human head relative to a human neck.

The jaw 42 is a three-dimensional replica of the natural mouth anatomy of the original subject. From the molds made from the subject as described above, numerous heads 124 having the identical jaw 42 can be made to enable an equal and comparable dental practice experience. In addition, numerous modified models of the subject's mouth can be made to replicate the different stages of an extended protocol and to produce variations in anatomy, both normal and pathological. The models may be modified at the 3-D digital model stage to create modified molds. Accordingly, one may experience, in a few days, a protocol that otherwise might take over a year to complete with a patient.

The restorative portion of dental implant therapy would occur following the surgery. The restorative portion occurs on models, which are customized to reflect the same dental configuration as the jaw 42, but reflect the dentition of the patient following surgery. The models are mounted in the mannequin using an articulating hinging jaw which is available from multiple manufacturers of dental simulation-laboratory training equipment. However, with the accelerated benefit, the restorative portion (which could take months to complete on a patient) can be accomplished in one half-day session with a single model. This is accomplished by having all stages that would be performed by a dental tab already completed. Thus, one would only perform the tasks that would be in the dental office (e.g., typical time for these tasks can be less than 2 to 4 hours). For example, a dentist would make an impression of the patient's mouth and send it to the dental lab to have a stone study model made. Similarly for practice sessions, the practitioner makes an impression of the model's mouth and brings or sends it to the simulated lab. The step of pouring and curing a stone model is avoided during the practice session, however, because the simulated lab can immediately provide a pre-made, stone model without any wait. This sequence of events, as well as other processes performed by both the dental office and dental laboratory, can be carried out in a realistic sequence until the case is completed in the simulated lab in a few hours versus days to weeks and maybe even months in the real world. In addition, because the mandible may be assembled separately from the maxilla, the model mandible of one model may be combined with the maxilla of another model to create a variety of model patients.

The varying layers of the jaw 42 provide a realistic experience when cutting and drilling through the layers and/or handling the components of the jaw 42. Because the layers are constructed using molds produced from a 3-D digital model of a human, the molded layers mate with one another in a human-like manner.

Referring to FIGS. 6-9, the model head 30 also may be equipped with a simulated nervous or nerve system 130. More specifically, the nerve system 130 may generally include a nerve 132 (FIG. 6), a circuit 134 (FIG. 9), and the operable eyes 34 and 36 (FIG. 1) on the model head 30.

As shown in FIGS. 6 and 7, the nerve 132 may extend through various parts of the mandible 46 and the maxilla 44 consistent with the anatomy of the human jaw. The positions of the nerve 132 may differ among models to correspond to the variation in the nerve positions on humans. These variations then may be reflected in pre-made radiographs and simulated medical records provided, for example, to the dental professional performing the simulated dental procedures. The layers are radiolucent so that x-rays may be taken of the models.

The nerve 132 communicates with the circuit 134 by wires that may be different colors to indicate different nerves if multiple nerves 132 (such as left side and right side nerves) are provided. Each nerve 132 is comprised of a bundle of fine hair-like fibers or wires such that when a wire is severed or sufficient coating is removed from the wire to cause a short-circuit, it is detected by the circuit 134. By one approach, as shown in FIG. 7, a thin insulated wire is folded back and forth and then wound around the folded portion of the wire to form a relatively small elongated wire bundle. For example, the bundle may be approximately 2 mm in diameter to have a dimension that approximately matches that of a human nerve. So configured, the fine wire bundle generally provides relatively greater sensitivity and, thus, better resembles the response of a human nerve, like actual nerves while also occupying the same space as human nerves would occupy. The nerve 132 may be configured from very fine, lacquer-coated copper wire. This bundle is embedded into the jaw bone layers as mentioned above.

The circuit 134 may be configured on a circuit board 138 and may be mounted in the skull cap 122 by brackets and/or any other sufficient fastening device. Wires connecting the nerve 132 to the circuit board 138 may terminate at one or more panels 194 of quick disconnect clips also mounted on the inside of the skull cap 122 as shown in phantom line in FIG. 33. The panel 194 is located where it can be conveniently accessed to unplug the wires to remove a jaw and plug in the wires of a new jaw being installed. The circuit board 138 communicates via wires to two sets of indicators 38, 40.

Figure 9:
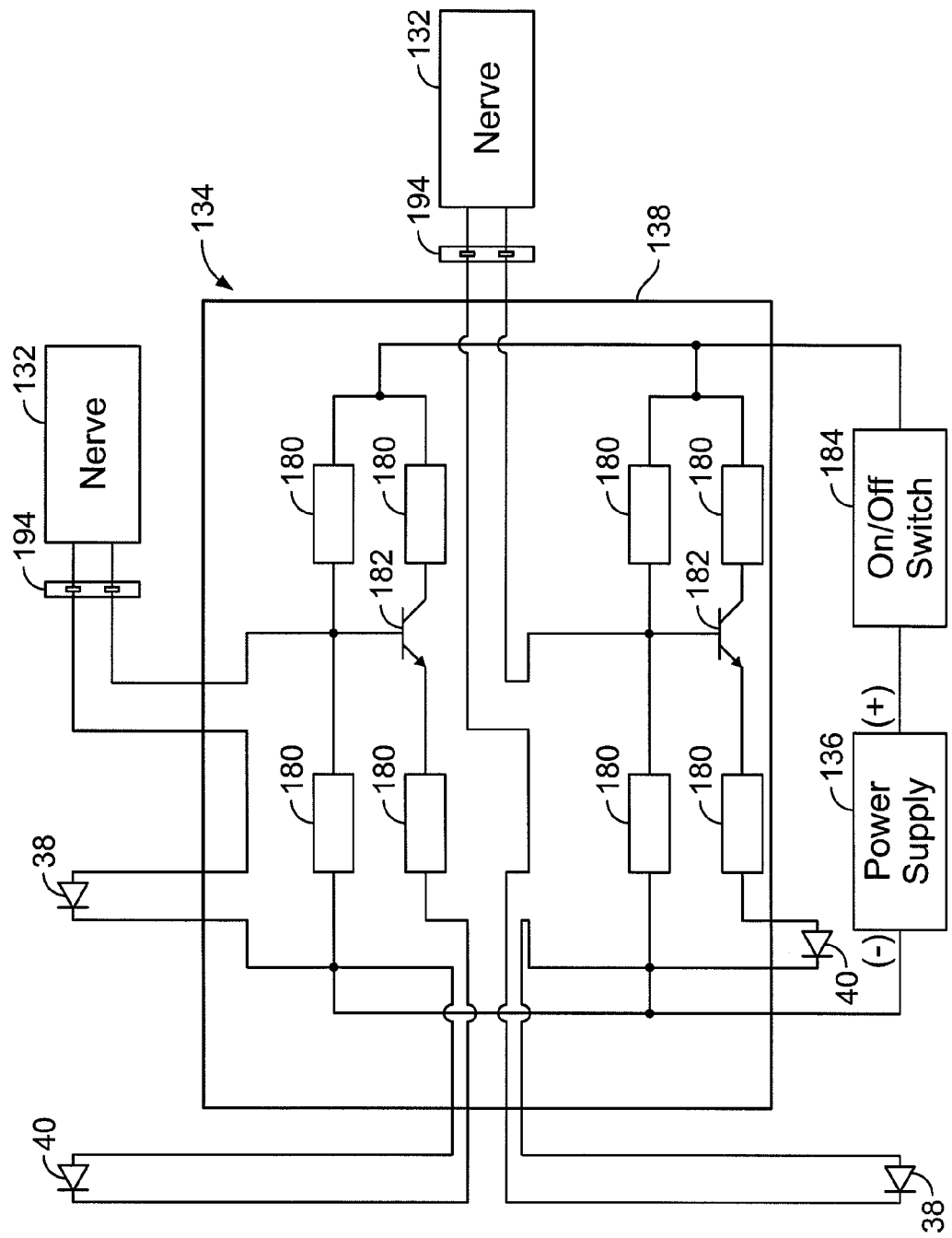
FIG. 9 is a schematic diagram of the nerve system of the patient model of FIG. 1.

As shown in FIG. 9, the preferred circuit board 138 includes the circuit 134. The circuit 134 has a number of resistors 180 and transistors 182 to monitor the current through the nerve(s) 132 and to control the indicators 38 and 40 in response to changes in the current. For example, the indicators 38 and 40 are respectively provided on parallel lines with the indicator 38 provided on the same line as the nerve 132. The transistor 182 interconnects the two parallel lines so that when the nerve 132 is cut, electricity to the indicator 38 is cut off and the transistor 182 is turned on to provide electricity to the other parallel line with indicator 40. A power supply 136, such as a nine volt battery, may power the circuit 134 and may be mounted on the circuit board 138 or on another place on the model head 30. It will be appreciated that circuit 134 may have many different forms than that disclosed here.

Figure 33:
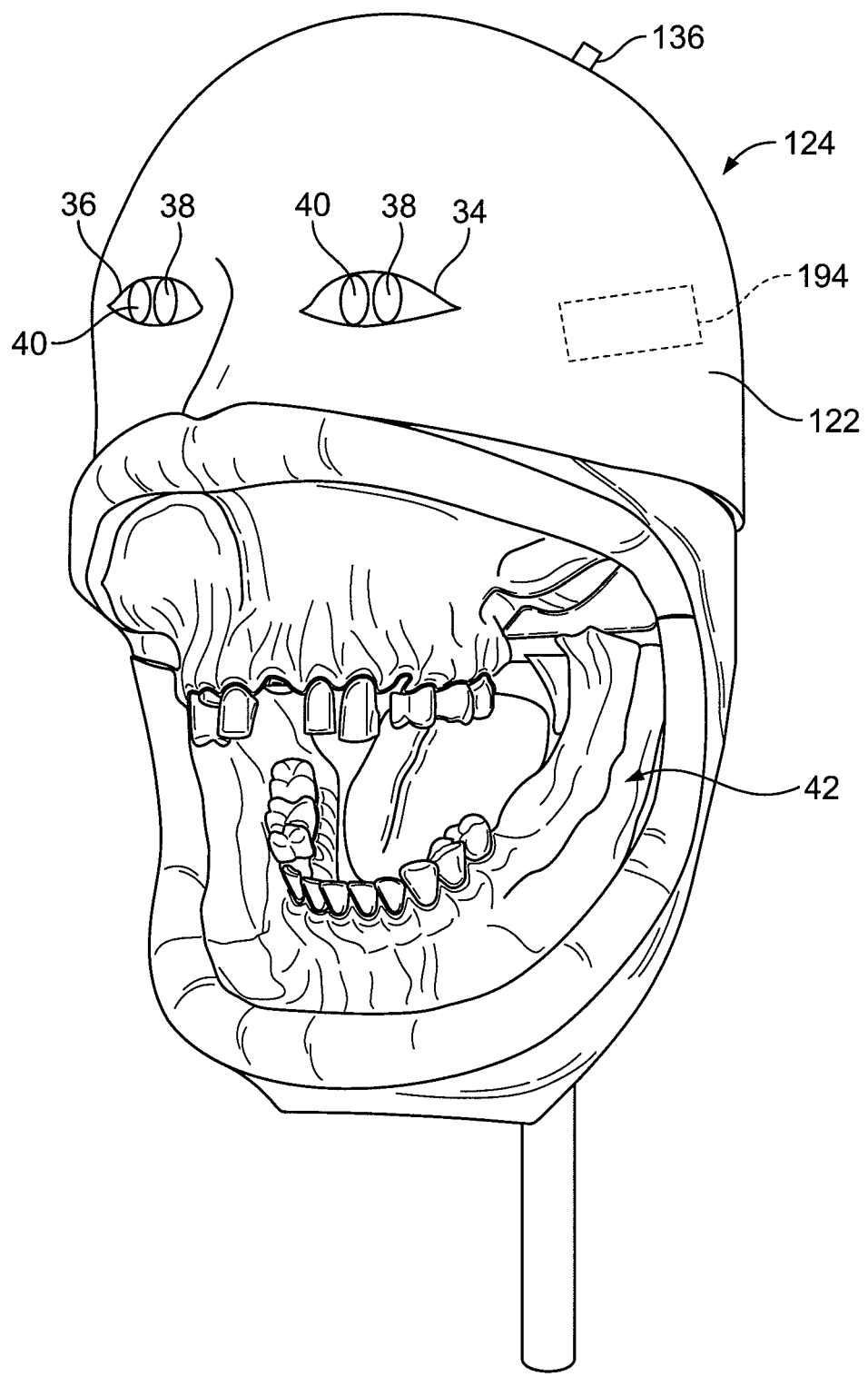
FIG. 33 is a front perspective view of the assembled model head of FIG. 32.
Figure 34:
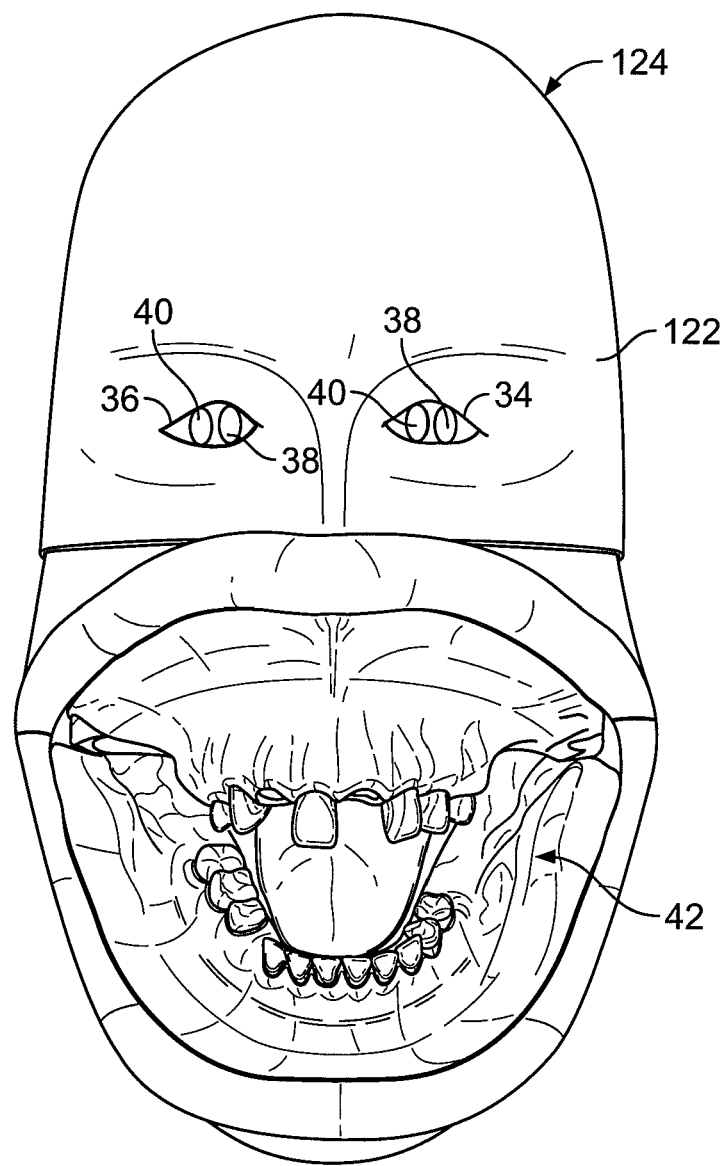
FIG. 34 is a front view of an assembled model head according to another embodiment of the present invention.

A control or on/off switch 184 may be mounted on the circuit board 138 or on the back of the skull cap 122, as shown in FIG. 33, for activating and deactivating the nerve system 130. When the circuit 134 is on and the wires of the nerve 132 are intact, the circuit 134 sends a signal to the first indicator 38 causing the first indicator 38 to provide a visual indication. For instance, the first indicator 38 may be in the form of a green light, which is illuminated when the signal is received. To indicate that the circuit 134 is on, the first indicator 38 may remain illuminated until the circuit is turned off or the circuit receives a signal from the nerve 132. When the wire or nerve 132 is pressed against, engaged, severed or damaged (or otherwise passed through), the circuit 134 receives a signal (which in this case is the detection of no energy passing through the nerve 132 but may be in the form of a positive signal or detection of decreased flow of energy through nerve 132 in other cases). Once electrical flow through the nerve 132 has stopped, the indicator 38 also turns off due to lack of flow, and the circuit 134 turns on the indicator 40 due to resulting increased voltage provided to the transistor 182. The indicator 40 may be in the form of a red light or flashing light. When two nerves 132 are present, the indicators 38 and 40 in the left eye 34 may provide the condition of a left nerve 132 while the indicators 38 and 40 of the right eye 36 provide the condition of a right nerve 132.

Although the indicators 38 and 40 are described as being two separate visual indicators, they could be combined into a single indicator. For instance, the indicator could be in the form of a light that is steadily on until nerve 132 is damaged, at which time the light flashes (or vice-versa), or it may include LEDs that can change color. Further, the indicators may be in the form of an audio indicator or combination of visual and audio indicators.

In addition, the nerve 132 could be formed of alternative material other than a bundle of fibers. For instance, the nerve also could be made of a "pressure sensitive" material or with some type of electro-magnetic or sonic "beam," which, when "interfered with" by trauma, would illicit some type of visual and/or auditory signal. By another approach, the nerve may be a line of sight optical sensor 186 (shown in dashed lines on FIG. 6), provided by a fiber optic cable 188 embedded in the jaw, so that passing a scalpel or drill through a light beam 198, for instance, will also send a signal to the circuit 134.

Figure 35:
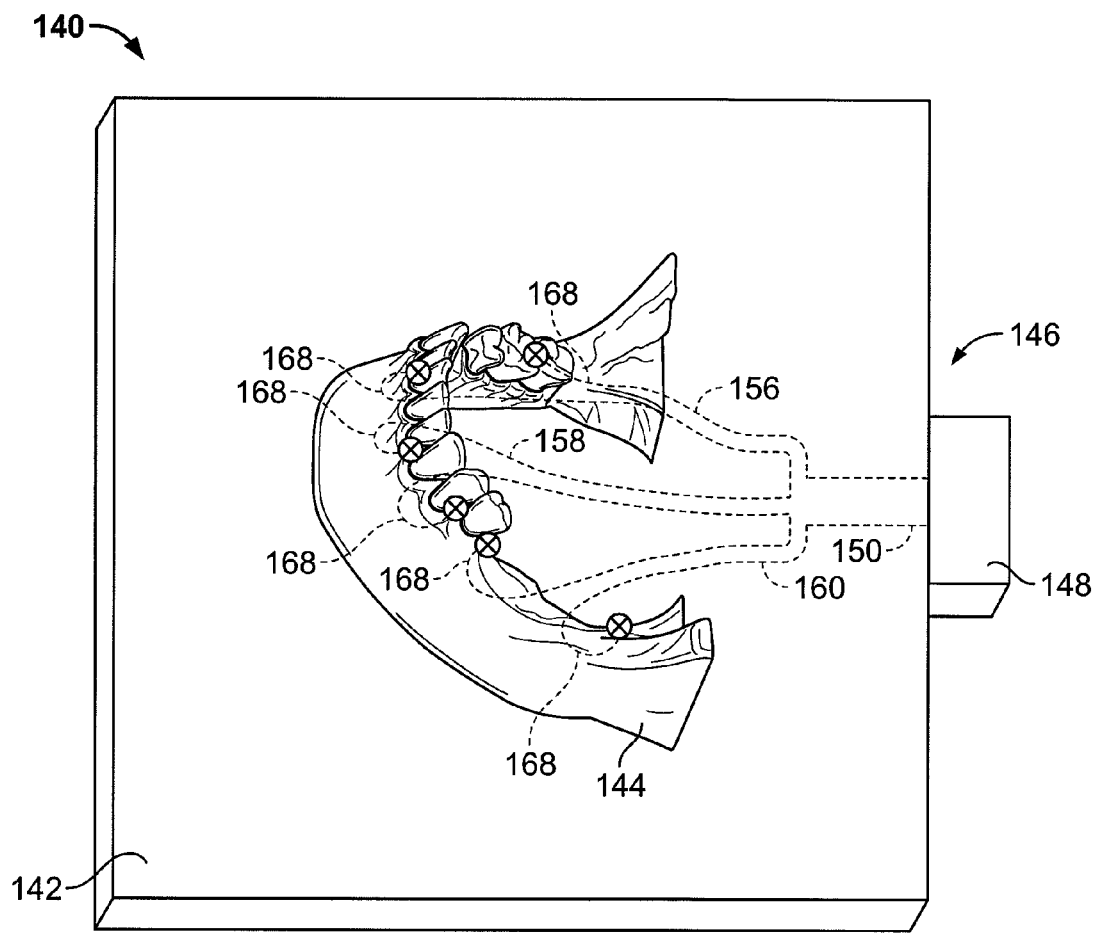
FIG. 35 is a perspective view of a suture board according to another embodiment of the present invention.
Figure 36:
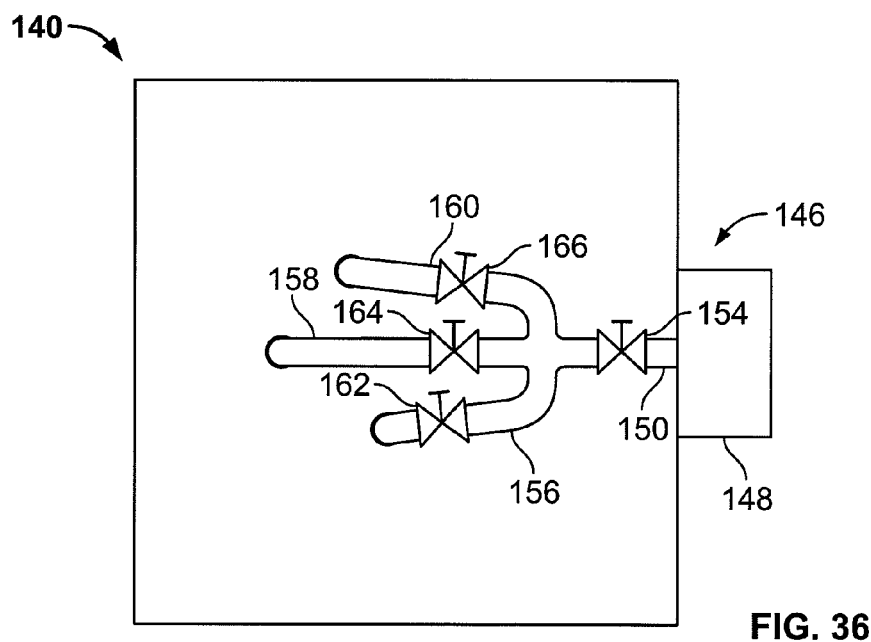
FIG. 36 is a bottom view of the suture board of FIG. 35.
Figure 37:
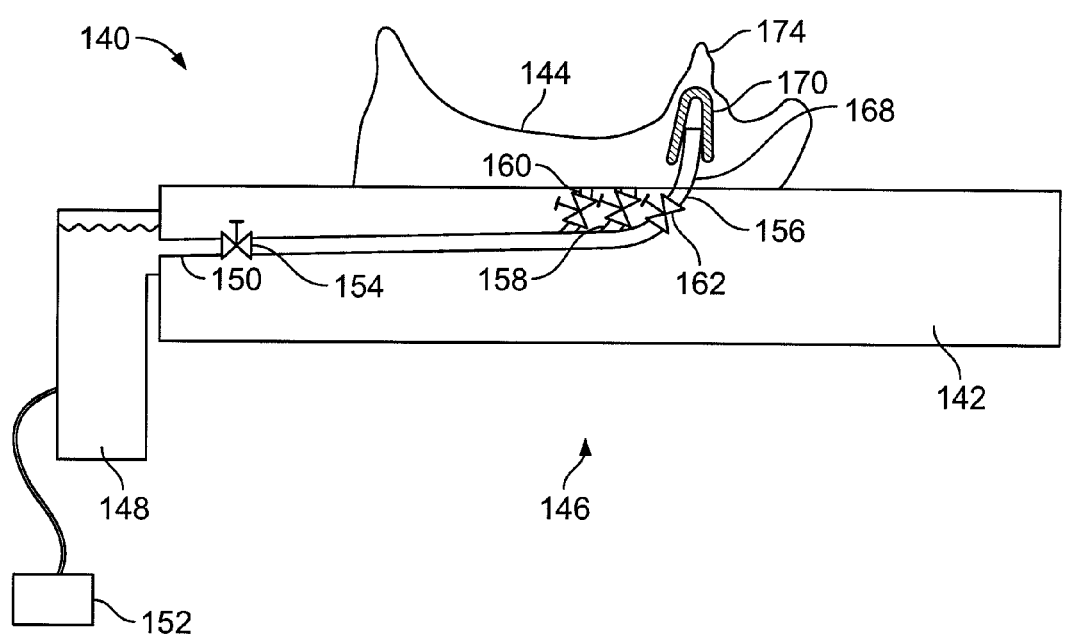
FIG. 37 is a side sectional view of the suture board of FIG. 35.
Figure 38:
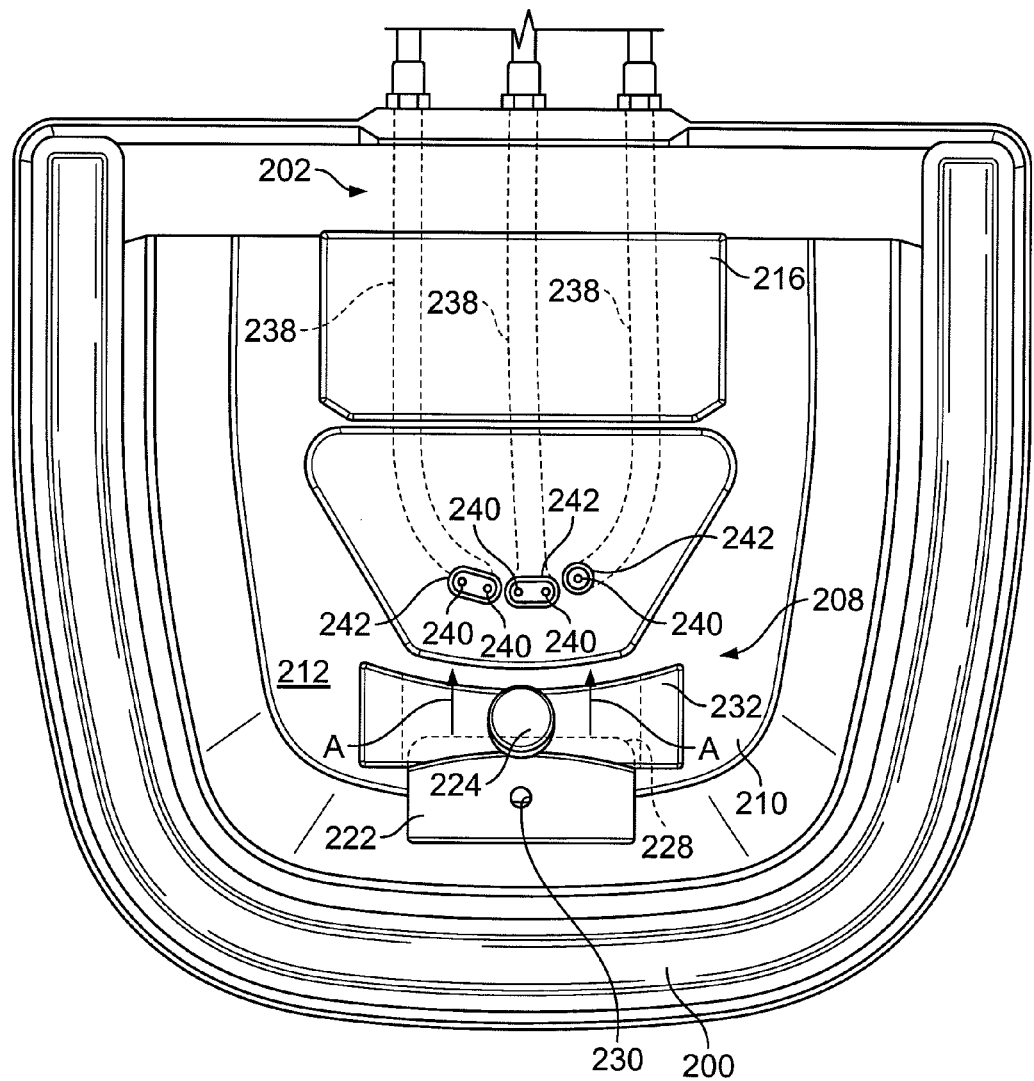
FIG. 38 is a top view of yet another suture board according to another embodiment of the present invention.
Figure 39:
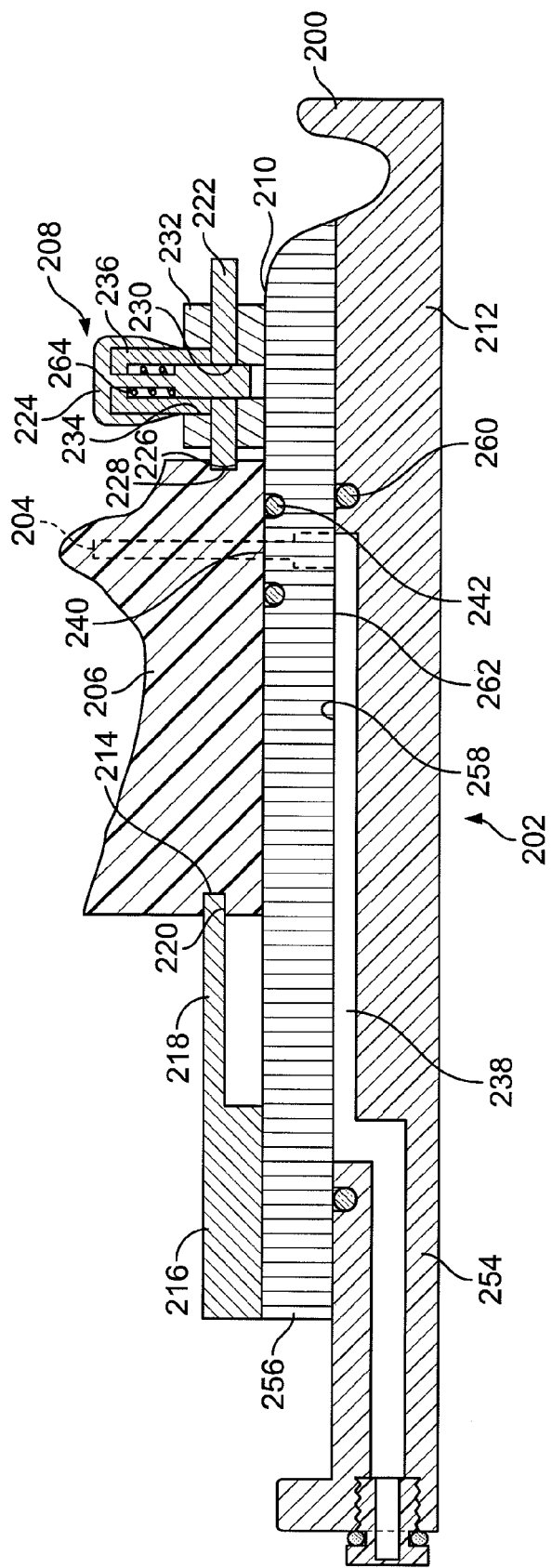
FIG. 39 is a cross-sectional, side view of the suture board of FIG. 38 showing a model jaw thereon.
Figure 40:
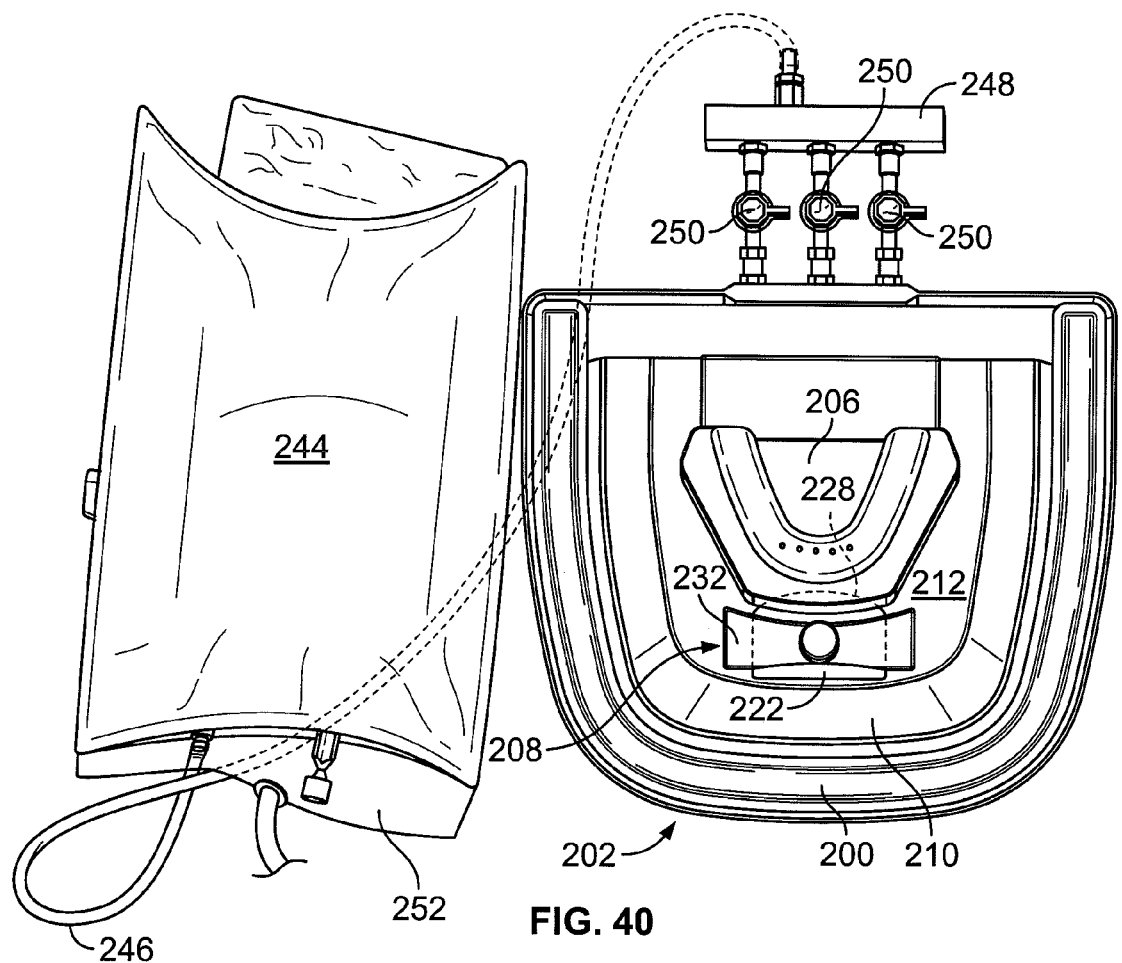
FIG. 40 is a top view of the suture board of FIG. 39 showing a model jaw mounted thereon.
Figure 41:
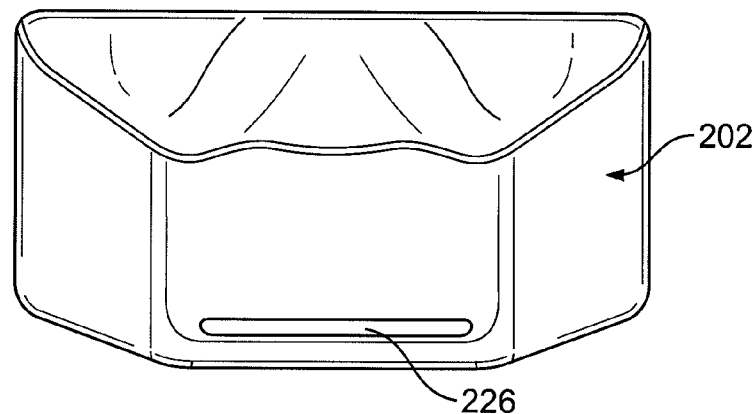
FIG. 41 is a front view of the model jaw shown in FIG. 40.
Figure 42:
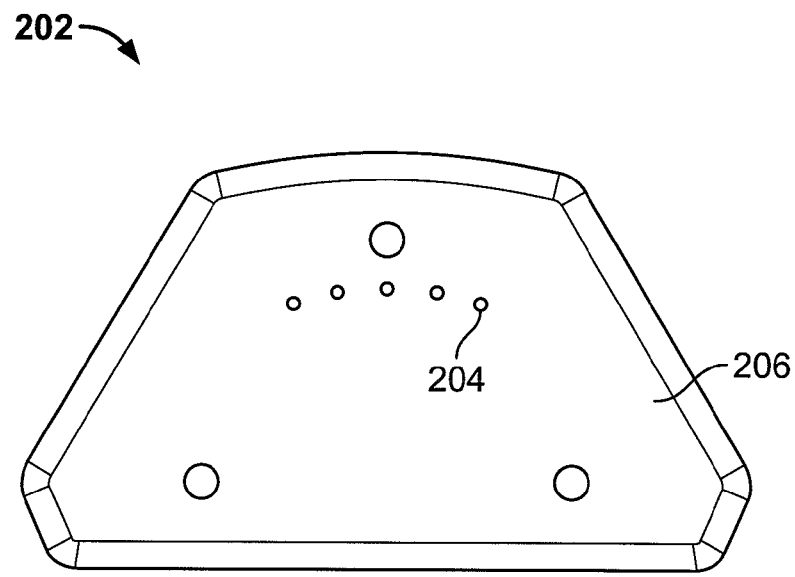
FIG. 42 is a bottom view of the model jaw shown in FIG. 40.
Figure 43:
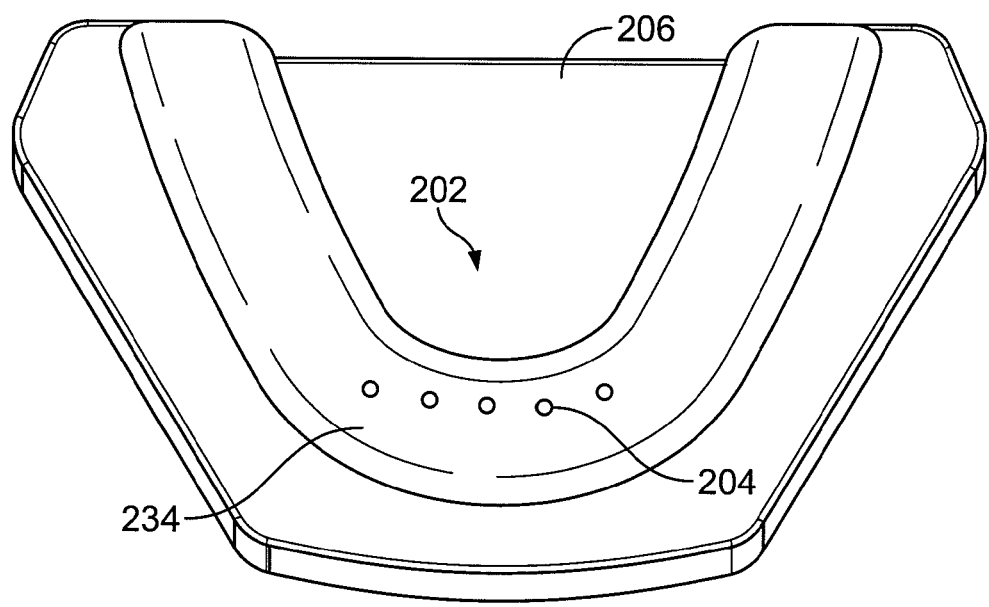
FIG. 43 is a top view of the model jaw shown in FIG. 40 with a portion removed to show fluid vessels.
Figure 44:
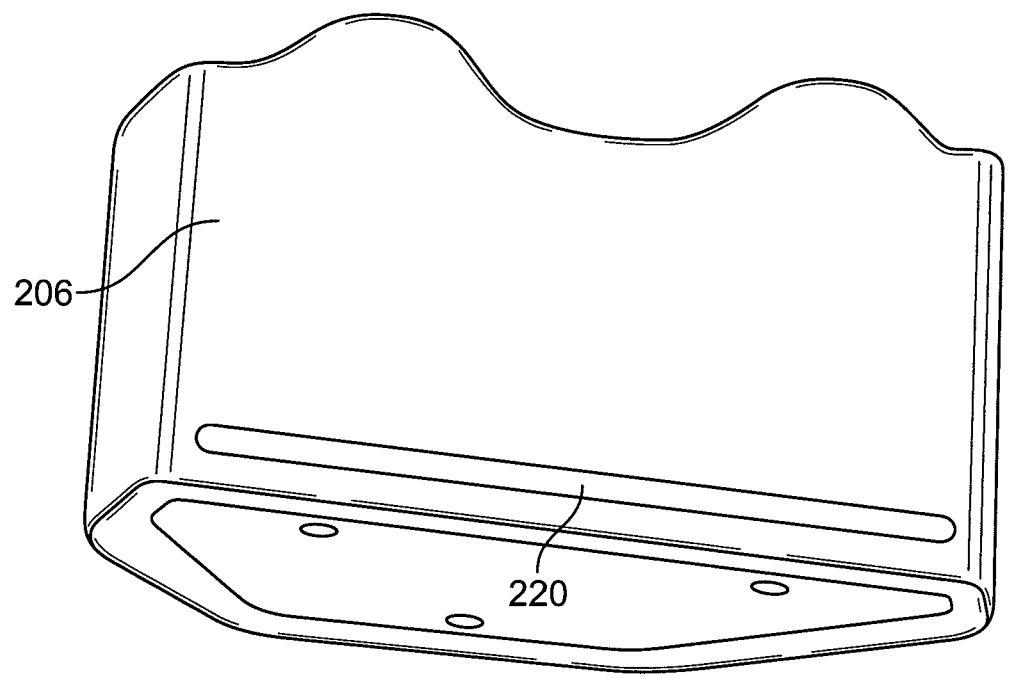
FIG. 44 is a back view of the model jaw shown in FIG. 40.

Referring to FIGS. 35-37, there is illustrated a suture board 140 with a tray 142 on which one or more mandibles 144 or maxillae (not shown) are mounted. The suture board 140 is designed to provide numerous opportunities to practice cutting tissue to create flaps and to perform various suturing techniques. The mandible 144 is constructed of urethane or similar substances and is covered with mucosa, periosteum, and the other layers and structure as described in the model 42 above.

The mandible 144 also may be equipped with a circulatory system 146 to emulate blood vessels to provide realistic experiences involving considerations and concerns associated with vessels and bleeding. Although there is illustrated a separate model, a similar circulatory system could be incorporated into the previously described jaw 42. The circulatory system 146 includes a fluid or imitation blood source 148 from which a main fluid passage, vessel or line 150 extends. The blood source 148 may be a bag or container containing water or colored fluid. The fluid from the blood source 148 is pumped to and through the main line 150 via a pump 152 (FIG. 37). A main valve 154 is coupled to the main line 150 and is operable to control the flow through the main line 150.

Primary fluid passages formed by primary vessels or branches 156, 158, and 160 may extend from the main line 150 and deliver fluid to different regions of the mandible 144. Each of the vessels 156-160 is equipped with a corresponding valve 162-166, which allow the flow of fluid to be selectively controlled to each of the branches 156-160. Secondary branches 168 extend from the primary branches 156-160 and deliver fluid to specific points in the corresponding regions of the mandible 144. For instance, the mandible 144 may include nutrient canals or vessels 170, which feed the bone and tissue surrounding and between the teeth 172. In patients, the nutrient vessels are often in hard-to-reach locations, such as between teeth, and damage to the nutrient vessel may be difficult to control. If the nutrient vessel 170 is ruptured, fluid will discharge from the branch 168 (FIG. 37), thus replicating the problems associated with damaging blood vessels and nutrient canals in patients. The valves 162-166 may be adjusted to help control the pressure in the ruptured nutrient vessel and maintain the bleeding effects. This provides an opportunity to experience the difficulties in dealing with ruptured vessels and to practice techniques to control the bleeding.

The fluid passages 150 and 156-160 may be formed by tubes extending along the bottom of tray 142 or embedded within the tray 142. The tubes can extend through the tray 142 and into the mandible jaw 144 to connect to the nutrient vessels 170 in the jaw. Alternatively, the fluid passages 150 and 156-160 may be integrally defined by the tray 142 which would eliminate additional tubular material.

Referring to FIGS. 38-44, another suture board 200 is provided with a circulatory system 202 that has at least one vessel 204 disposed on a jaw 206 mounted on the board 200. The vessel 204 is in a position simulating the position of a blood vessel on a human jaw so that the vessel 204 will discharge fluid if ruptured. In that case, a top 210 of the tray 212 has a trough for collecting spilled fluid.

The suture board 200 includes a mounting mechanism 208 to securely mount the jaw 206 on the top 210 of a tray 212 so that it does not move unintentionally during surgical procedures. The mounting mechanism 208 includes a flange or elongated tab 214 extending transversely across tray 212 on the back plate 216. More specifically, the flange 214 is located on the front side 218 of the back plate 216 and is spaced from the top 210 of the tray 212. The jaw 206 includes a groove or slot 220 (FIGS. 39 and 44) that receives the flange 214 to secure the back of the jaw 206. The front of the jaw 206 is secured by a locking plate 222 and a pin 224. More specifically, the front of the jaw 206 defines an elongated slot 226 (FIGS. 39 and 41) that receives an edge 228 of the locking plate 222. The locking plate 222 defines a pin aperture 230 that receives the locking pin 224. A bracket 232 on the tray 212 defines a threaded aperture 234 that aligns with the pin aperture 230 when the locking plate 222 is positioned to secure the jaw 206. The pin 224 extends through the pin aperture 230 and is biased toward a locked, extended position by, in one example, a coil spring 264 in a base 236 of the pin 224. The base 236 is threaded into the threaded aperture 234 of the bracket 232. This configuration for the jaw 206 and the mounting mechanism 208 can be used on suture boards without a simulated circulatory system and may have more than one bracket locking mechanism to mount both the mandible and the maxilla on a single board.

Similar to the circulatory system 146, the circulatory system 202 has fluid passages 238 that extend underneath or within the tray 212 and terminate with openings 240 on the top 210 of the tray 212. The nutrient vessels 204 of the jaw 206 generally align with the openings 240 so that the fluid passages 238 can provide pressurized fluid to the vessels 204. A gasket 242 is placed in a groove around one or two openings 240 to provide a seal between the top 210 of the tray 212 and the bottom of the jaw 206 for the interconnection of the fluid passage 238 and the nutrient vessels 204.

The circulatory system 202 also includes a pump 252, such as a pump-up pressure cuff, connected to a fluid bag 244. The pressurized fluid in the bag 244 flows through a main tube 246 to a manifold 248. The manifold separates the fluid to supply the three fluid passages 238. Each fluid passage 238 is controlled by a valve 250 positioned between the manifold 248 and the tray 210. The valves 250 can be used to control the amount of flow to the different areas of the jaw 206 and can be used to cease flow to one or more of the areas of the jaw 206

As with the circulatory system 146, the fluid passages 238 of the circulatory system 202 also may be formed by channels defined by the tray 12. In the illustrated example, the tray 212 is formed by a base 254 and a separate support plate 256 mounted on top of, and secured to, the base 254. The top of the support plate 256 forms most of the top 210 of the tray 212. The fluid passages 238 are formed on the top surface 258 of the base 254 and are enclosed by the support plate 256. Gaskets or sealing rings 260 are disposed in separate grooves on the top surface 258 of the base 254 and around each fluid passage 238 to provide a seat between the top surface 258 of the base 254 and the bottom 262 of the support plate 256.

Alternatively, the fluid passages may be tubes running along or within the tray 212, extending through the tray, and into the jaw 206. The suture board 200 may be mounted to a model dental patient head such as the one described previously. The circulatory system also is not limited to any particular number of branches or configurations of fluid passages, channels, or vessels as long as at least one fluid passage and at least one rupturable nutrient vessel is provided.

It will be understood that various changes in the details, materials, and arrangements of parts and components, which have been herein described and illustrated in order to explain the nature of the invention may be made by those skilled in the art within the principle and scope of the invention as expressed in the appended claims.

What is claimed is:
1. A dental patient model, comprising:
  a jaw corresponding to a human jaw and configured to be modified by a surgical tool, the jaw including;
    a mandible having a mandibular bone layer;
    a maxilla having a maxillary bone layer;
    a mandibular periosteum layer at least partially covering the mandibular bone layer; and
    a maxillary periosteum layer at least partially covering the maxillary bone layer; and a nerve system including at least one simulated nerve, associated with the jaw and corresponding to a human nerve, and at least one indicator, operatively coupled to the at least one simulated nerve, to indicate a condition of the at least one simulated nerve.

2. The dental patient model of claim 1, the jaw further comprising:
a mandibular gingival layer at least partially covering the mandibular periosteum layer and the mandibular bone layer, wherein the mandibular bone layer defines at least one mandibular tooth socket, the mandibular tooth socket coupled to a mandibular tooth; and
a maxillary gingival layer at least partially covering the maxillary periosteum layer and the maxillary bone layer, wherein the maxillary bone layer defines at least one maxillary tooth socket, the maxillary tooth socket coupled to a maxillary tooth.

3. The dental patient model of claim 1, wherein:
the mandibular bone layer includes a mandibular cortical layer and a mandibular cancellous layer; and
the maxillary bone layer includes a maxillary cortical layer and a maxillary cancellous layer.

4. The dental patient model of claim 1, wherein the at least one simulated nerve is disposed at a position approximating a position of a human nerve of the human jaw.

5. The dental patient model of claim 4, wherein the at least one simulated nerve includes a conductor configured to allow current flow in a first operational mode and inhibit current flow in a second operational mode,
the first and second operational modes affected by a proximity of the surgical tool relative to the at least one simulated nerve.

6. The dental patient model of claim 1, wherein the at least one indicator is configured to emit a first signal, to indicate a normal condition for the nerve system, and a second signal, to indicate a condition deviating from the normal condition for the nerve system.

7. A dental patient model, comprising:
a jaw corresponding to a human jaw and configured to be modified by a surgical tool, the jaw including:
a mandible including a mandibular bone layer defining a mandibular tooth socket, a mandibular tooth coupled to the mandibular tooth socket, and a mandibular periodontal ligament coupled to the mandibular tooth; and
a maxilla including a maxillary bone layer defining a maxillary tooth socket, a maxillary tooth coupled to the maxillary tooth socket, and a maxillary periodontal ligament coupled to the maxillary tooth.

8. The dental patient model of claim 7, further comprising a nerve system including at least one simulated nerve, associated with the jaw and corresponding to a human nerve, and at least one indicator, operatively coupled to the at least one simulated nerve, to indicate a condition of the at least one simulated nerve.

9. The dental patient model of claim 8, wherein the at least one indicator is configured to emit a first signal, to indicate it normal condition for the nerve system, and a second signal, to indicate a condition deviating from the normal condition for the nerve system.

10. The dental patient model of claim 8, wherein the at least one indicator includes a light emitting member configured to be continuously lit, to indicate a first condition for the nerve system, and configured to flash, to indicate a second condition for the nerve system.

11. The dental patient model of claim 7, further comprising a circulatory system including a simulated vessel disposed in the mandible, generally in a position corresponding to a position of a human blood vessel, and configured to expel fluid when the simulated vessel is ruptured.

12. The dental patient model of claim 7, wherein:
at least one of the mandible and the maxilla are covered by a gingival layer, a lip, and a cheek, and
the lip and the cheek are formed in a retracted configuration, spaced away from the at least one of the mandible and the maxilla and the gingival layer, for providing convenient access to the at least one of the mandible and the maxilla and the gingival layer.

13. The dental patient model of claim 7, wherein:
the mandibular bone layer includes a mandibular cortical layer and a mandibular cancellous layer; and
the maxillary bone layer includes a maxillary cortical layer and a maxillary cancellous layer.

14. The dental patient model of claim 7, further comprising a connective tissue insert coupled to the jaw.

15. A dental patient model, comprising:
a jaw corresponding to a human jaw and configured to be cut or drilled by a surgical tool to imitate a dental procedure, the jaw including:
a mandible having a mandibular bone layer including a mandibular cortical layer and a mandibular cancellous layer and defining a mandibular tooth socket, a mandibular tooth coupled to the mandibular tooth socket, and a mandibular gingival layer disposed over the mandibular bone layer; and
a maxilla having a maxillary hone layer including a maxillary cortical layer and a maxillary cancellous layer and defining a maxillary tooth socket, a maxillary tooth coupled to the maxillary tooth socket, and a maxillary gingival layer disposed over the maxillary bone layer; and
a nerve system including a simulated nerve, associated with the jaw and corresponding to a human nerve, and an indicator, operatively coupled to the simulated nerve, to indicate a condition of the simulated nerve.

16. The dental patient model of claim 15, wherein the simulated nerve is disposed at a position approximating a position of a human nerve of the human jaw.

17. The dental patient model of claim 15, wherein the simulated nerve includes a conductor configured to allow current flow in a first operational mode and inhibit current flow in a second operational mode,
the first and second operational modes affected by a proximity of the surgical tool relative to the at least one simulated nerve.

18. The dental patient model of claim 15, wherein the indicator is configured to emit a first signal, to indicate a normal condition for the nerve system, and a second signal, to indicate a condition deviating from the normal condition for the nerve system.

19. The dental patient model of claim 18, wherein the first signal includes a first color light emission and the second signal includes a second color light emission.

20. The dental patient model of claim 5, wherein the indicator is configured to produce an audible signal.

* * * * *

UNITED STATES PATENT AND TRADEMARK OFFICE
CERTIFICATE OF CORRECTION

PATENT NO. : 9,159,247 B2
APPLICATION NO. : 13/900145
DATED : October 13, 2015
INVENTOR(S) : Fred A. Bell It is certified that error appears in the above-identified patent and that said Letters Patent is hereby corrected as shown below:

In the Claims

In column 11, line 58, in Claim 9, delete "it" and insert --a--, therefor

In column 12, line 34, in Claim 15, delete "hone" and insert --bone--, therefor

In column 12, line 62, in Claim 20, delete "5," and insert --15,--, therefor

Signed and Sealed this
Twenty-second Day of March, 2016

Michelle K. Lee
*Director of the United States Patent and Trademark Office*